US012652294B2

(12) United States Patent
    Kim et al.

(10) Patent No.: US 12,652,294 B2
(45) Date of Patent: Jun. 9, 2026

(54) CONTROLLER AREA NETWORK INTRUSION DETECTION SYSTEM AND OPERATING METHOD THEREOF

(71) Applicant: Autocrypt Co., Ltd., Seoul (KR)

(72) Inventors: Duk Soo Kim, Seoul (KR); Eui Seok Kim, Seoul (KR); Sang Gyoo Sim, Seoul (KR); Ki Ho Joo, Seoul (KR); Jung Won Lee, Seongnam-si (KR); Jong Guk Lee, Suwon-si (KR); Jung Wook Kim, Seoul (KR); Sang Seok Lee, Seoul (KR); Yeong Wan Seo, Seoul (KR); Si Ho Ha, Seoul (KR); Yeong Dae Lee, Seoul (KR)

(73) Assignee: AUTOCRYPT CO., LTD., Seoul (KR)

( * ) Notice: Subject to any disclaimer, the term of this patent is extended or adjusted under 35 U.S.C. 154(b) by 237 days.

(21) Appl. No.: 18/388,716

(22) Filed: Nov. 10, 2023

(65) Prior Publication Data

US 2025/0126132 A1      Apr. 17, 2025

(30) Foreign Application Priority Data

Oct. 11, 2023     (KR) ........................ 10-2023-0135377

(51) Int. Cl.
     *H04L 9/40*              (2022.01)
(52) U.S. Cl.
     CPC ...... *H04L 63/1416* (2013.01); *H04L 63/1425* (2013.01)

(58) Field of Classification Search
     CPC ............. H04L 63/1416; H04L 63/1425; H04L 2012/40215; H04L 63/1408; H04L 12/40; H04L 63/1433; H04L 2012/40273
     See application file for complete search history.

(56) References Cited

U.S. PATENT DOCUMENTS

| | | | |
|---|---|---|---|
| 11,269,939 B1 * | 3/2022 | Sammer | H04L 67/55 |
| 11,721,137 B2 * | 8/2023 | Fang | G07C 5/0816 |
| | | | 701/31.5 |
| 11,729,183 B2 | 8/2023 | Park et al. | |
| 12,335,278 B2 * | 6/2025 | Kim | B60W 50/04 |
| 2022/0242419 A1 * | 8/2022 | Davidovich | B60W 40/105 |

FOREIGN PATENT DOCUMENTS

WO        2018/127790 A2     7/2018

* cited by examiner

*Primary Examiner* — Anh Nguyen
(74) *Attorney, Agent, or Firm* — Goldilocks ZONE IP LAW

(57)                ABSTRACT

Provided are a controller area network (CAN) intrusion detection system (IDS) and an operating method thereof. The operating method includes receiving, by a CAN packet mirroring system, a CAN message from a CAN driver existing in an AUTomotive Open System ARchitecture (AUTOSAR) protocol data unit (PDU) router (PduR) region of an AUTOSAR layer, storing the received CAN message in a plurality of storage regions of a memory, reading, by an IDS core, data copied by the CAN packet mirroring system and transmitting the copied data to a detection engine base, and separately managing, by the IDS core of an IDS core layer, a first memory region for storing a policy binary file which is policy rules of the IDS and a second memory region for storing a buffering table for buffering and storing the CAN message.

16 Claims, 21 Drawing Sheets

FIG. 15

| | 0 | 1 | 2 | 3 | 4 | 5 | 6 | 7 |
|---|---|---|---|---|---|---|---|---|
| | 0 1 2 3 4 5 6 7 | 0 1 2 3 4 5 6 7 | 0 1 2 3 4 5 6 7 | 0 1 2 3 4 5 6 7 | 0 1 2 3 4 5 6 7 | 0 1 2 3 4 5 6 7 | 0 1 2 3 4 5 6 7 | 0 1 2 3 4 5 6 7 |
| | log_type | can bus number | violation rule id | signal start bit | | signal length | | raw message length |
| | message can id | | | detection reason | | detection time | | |
| | duplicate number | | | reserved (6byte) | | | | |
| | reserved (8byte) | | | | | | | |
| | raw message body (64byte) | | | | | | | |

FIG. 18

| 0 | 1 | 2 | 3 | 4 | 5 | 6 | 7 |
|---|---|---|---|---|---|---|---|
| 0 1 2 3 4 5 6 7 | 0 1 2 3 4 5 6 7 | 0 1 2 3 4 5 6 7 | 0 1 2 3 4 5 6 7 | 0 1 2 3 4 5 6 7 | 0 1 2 3 4 5 6 7 | 0 1 2 3 4 5 6 7 | 0 1 2 3 4 5 6 7 |
| log_type | | | | Policy Version | | | reserved (1byte) |
| sequnce number | | | | IDS Firmware Version | | | |
| flash usage | | | | memory usage | | | |
| reserved (24byte) | | | | | | | |

2000

CONTROLLER AREA NETWORK INTRUSION DETECTION SYSTEM AND OPERATING METHOD THEREOF

CROSS-REFERENCE TO RELATED APPLICATIONS

This application claims priority to Korean Patent Application No. 10-2023-0135377, filed on Oct. 11, 2023, with the Korean Intellectual Property Office (KIPO), the entire contents of which are hereby incorporated by reference.

BACKGROUND

1. Technical Field

Example embodiments of the present disclosure relate in general to an intrusion detection system (IDS), and more particularly, to an IDS for a controller area network (CAN) and an operating method thereof.

2. Related Art

With the rapid electronification of vehicle parts, the types and number of electronic devices, such as electronic control units (ECUs), installed in vehicles are greatly increasing. These electronic devices are roughly classified into a power train control system, a body control system, a chassis control system, a vehicle network, a multimedia system, and the like. Here, the power train control system includes an engine control system, an automatic transmission control system, and the like. The body control system includes a body electronics control system, a convenience device control system, and a lamp control system. The chassis control system includes a steering control system, a brake control system, a suspension control system, and the like.

Vehicle networks include a controller area network (CAN), a FlexRay-based network, a Media Oriented System Transport (MOST)-based network, and the like. Multimedia systems include a navigation system, a telematics system, an infotainment system, and the like.

These systems or electronic devices installed in the systems are connected through a vehicle network, and the vehicle network is required for supporting functions of electronic devices. The CAN can support a transmission rate up to 1 Mbps and support automatic retransmission of colliding frames, cycle redundancy check (CRC)-based error detection, and the like.

Recently, the frequency of abuse of CANs in vehicles for car hacking techniques has been increasing. In other words, an attacker manipulates a certain ECU connected to a CAN, which is a communication network for connecting parts in a vehicle, to stop the vehicle, open or close doors or windows, and randomly control a radio.

Therefore, it is necessary to develop a method of effectively detecting an external attacker's intrusion on a CAN-based platform, particularly, one installed in a vehicle.

SUMMARY

Accordingly, example embodiments of the present disclosure are provided to substantially obviate one or more problems due to limitations and disadvantages of the related art.

Example embodiments of the present disclosure provide an intrusion detection system (IDS) in which a vehicle controller area network (CAN)-based platform detects an attacker's intrusion through a CAN and an operating method of the same.

In some example embodiments, an operating method of a CAN IDS including an electronic control unit (ECU) layer or AUTomotive Open System ARchitecture (AUTOSAR) layer, a real time environment (RTE) or interface connecting components of the AUTOSAR layer to an application (app), and an IDS core layer and IDS detect layer installed on the app, includes receiving, by a CAN packet mirroring system of the AUTOSAR layer, a CAN message from a CAN driver which exists in an AUTOSAR protocol data unit (PDU) router (PduR) region of the AUTOSAR layer, storing, by the CAN packet mirroring system, the received CAN message in a plurality of storage regions of a memory, reading, by an IDS core of the IDS core layer, data copied by the CAN packet mirroring system and transmitting the copied data to a detection engine base of the IDS core, and separately managing, by the IDS core of the IDS core layer, a first memory region for storing a policy binary file which is policy rules of the IDS and a second memory region for storing a buffering table for buffering and storing the CAN message.

The operating method may further include copying, by the CAN packet mirroring system, CAN standard message data stored in a first shared memory region of the memory to store the copied CAN standard message data in a first engine memory region and copying CAN flexible data (FD) message data stored in a second shared memory region of the memory to store the copied CAN FD message data in a second engine memory region.

The operating method may further include copying, by the IDS core, the CAN data from a shared memory and retrieving the copied CAN data to an engine memory before the copied CAN data is transmitted to the detection engine base. Here, the CAN message retrieved by the engine memory may be stored in the buffering table.

The operating method may further include searching, by the IDS core, a lookup table of policy binary files using bus information and a CAN identification (ID) of the previously retrieved CAN message to store the CAN message in the buffering table.

The operating method may further include storing, by the IDS core, the CAN message in a specific storage region of the memory using previously found buffering table type information of the CAN message. The buffering table type information may include buffer type information and buffer index information.

The operating method may further include searching, by the IDS core, the lookup table and processing the CAN message as at least one of a case where there is no corresponding information, a case where it is unnecessary to buffer the CAN message, and a case where it is necessary to process a case where the CAN message is buffered.

The operating method may further include searching, by the IDS core, the lookup table for a detection policy through a binary search on the basis of the bus and the CAN ID of the CAN message retrieved from the engine memory.

The operating method may further include, when there is no corresponding policy in the lookup table, storing, by the IDS core, the CAN messages in an unknown message buffer of the buffering table using unknown message buffering table information, increasing, by the IDS core, a head value of the stored message by one, and transmitting, by the IDS core, an address of a currently copied item in the buffering table, an address of detection policy rules, and information on a buffer type and a buffer index to the detection engine base through the interface.

The operating method may further include, when a corresponding detection policy is found in the lookup table, storing, by the IDS core, the corresponding CAN message in the buffering table of the memory using buffering table type information of the corresponding CAN message, increasing, by the IDS core, a head value of the stored message by one, and transmitting, by the IDS core, an address of a currently copied item in the buffering table, an address of detection policy rules, and information on a buffer type and a buffer index to the detection engine base through the interface.

The operating method may further include, when a detection policy corresponding to the CAN message is found in the lookup table, storing, by the IDS core, the corresponding CAN message in the buffering table of the memory region using buffering table type information of the corresponding CAN message, determining, by the IDS core, whether a buffer index of the buffering table type information is 0, null, inactivate, or minor, and determining, by the IDS core, that the corresponding CAN message is a message not requiring buffering.

The operating method may include transmitting, by the IDS core, a message address of a currently copied item and address information of detection policy rules to the detection engine base through the interface without storing the corresponding CAN message in the buffering table.

Example embodiments of the present disclosure also provide a CAN IDS including an ECU layer or an AUTOSAR layer installed on hardware, an RTE or an interface configured to connect components of the AUTOSAR layer to an app, and an IDS core layer and an IDS detect layer installed on the app. The AUTOSAR layer includes a CAN packet mirroring system. The CAN packet mirroring system receives a CAN message from a CAN driver which exists in an AUTOSAR PduR region of the AUTOSAR layer, stores the received CAN message in a plurality of storage regions of a memory, and separately manages the plurality of storage regions as a shared memory. Here, an IDS core of the IDS core layer reads data copied by the CAN packet mirroring system and transmits the copied data to a detection engine base of the IDS core and separately manages a first memory region for storing a policy binary file which is policy rules of the IDS and a second memory region for storing a buffering table for buffering and storing the CAN message.

The CAN packet mirroring system may copy CAN standard message data stored in a first shared memory region of the memory to store the copied CAN standard message data in a first engine memory region and may copy a CAN FD message data stored in a second shared memory region of the memory to store the copied CAN FD message data in a second engine memory region.

The IDS core may copy the CAN data from the shared memory and retrieve the copied CAN data to an engine memory before the copied CAN data is transmitted to the detection engine base. Here, the CAN message retrieved by the engine memory may be stored in the buffering table.

To store the CAN message in the buffering table, the IDS core may search a lookup table of policy binary files using bus information and a CAN ID of the retrieved CAN message.

The IDS core may store the CAN message in a specific storage region of the memory using previously found buffering table type information of the CAN message. The buffering table type information may include buffer type information and buffer index information.

The IDS core may search the lookup table and process the CAN message as at least one of a case where there is no corresponding information, a case where it is unnecessary to buffer the CAN message, and a case where it is necessary to process a case where the CAN message is buffered.

The IDS core may search the lookup table for a detection policy through a binary search on the basis of the bus and the CAN ID of the CAN message retrieved from the engine memory, and when there is no corresponding policy in the lookup table, store the CAN message in an unknown message buffer of the buffering table using unknown message buffering table information, increase a head value of the stored message by one, and transmit an address of a currently copied item in the buffering table, an address of detection policy rules, and information on a buffer type and a buffer index to the detection engine base through the interface.

The IDS core may search the lookup table for a detection policy through a binary search on the basis of the bus and the CAN ID of the CAN message retrieved from the engine memory, and when a corresponding policy or message is found in the lookup table, store the corresponding CAN message in the buffering table of the memory using buffering table type information of the corresponding CAN message, increase a head value of the stored message by one, and transmit an address of a currently copied item in the buffering table, an address of detection policy rules, and information on a buffer type and a buffer index to the detection engine base through the interface.

The IDS core may search the lookup table for a detection policy through a binary search on the basis of the bus and the CAN ID of the CAN message retrieved from the engine memory, store the corresponding CAN message in the buffering table of the memory region using buffering table type information of the corresponding CAN message when a detection policy corresponding to the CAN message is found in the lookup table, determine that the corresponding CAN message is a message not requiring buffering when a buffer index of the buffering table type information is 0, null, inactivate, or minor, and transmit a message address of a currently copied item and address information of detection policy rules to the detection engine base through an interface without storing the corresponding CAN message in the buffering table.

BRIEF DESCRIPTION OF DRAWINGS

Example embodiments of the present disclosure will become more apparent by describing example embodiments of the present disclosure in detail with reference to the accompanying drawings, in which:

FIG. 15 is a diagram illustrating a message structure of a detection log buffer that may be employed in the CAN IDS of FIG. 3;

FIG. 18 is a diagram illustrating a message structure of a status log buffer that may be employed in the CAN IDS of FIG. 3;

DETAILED DESCRIPTION OF THE EMBODIMENTS

Figure 1:
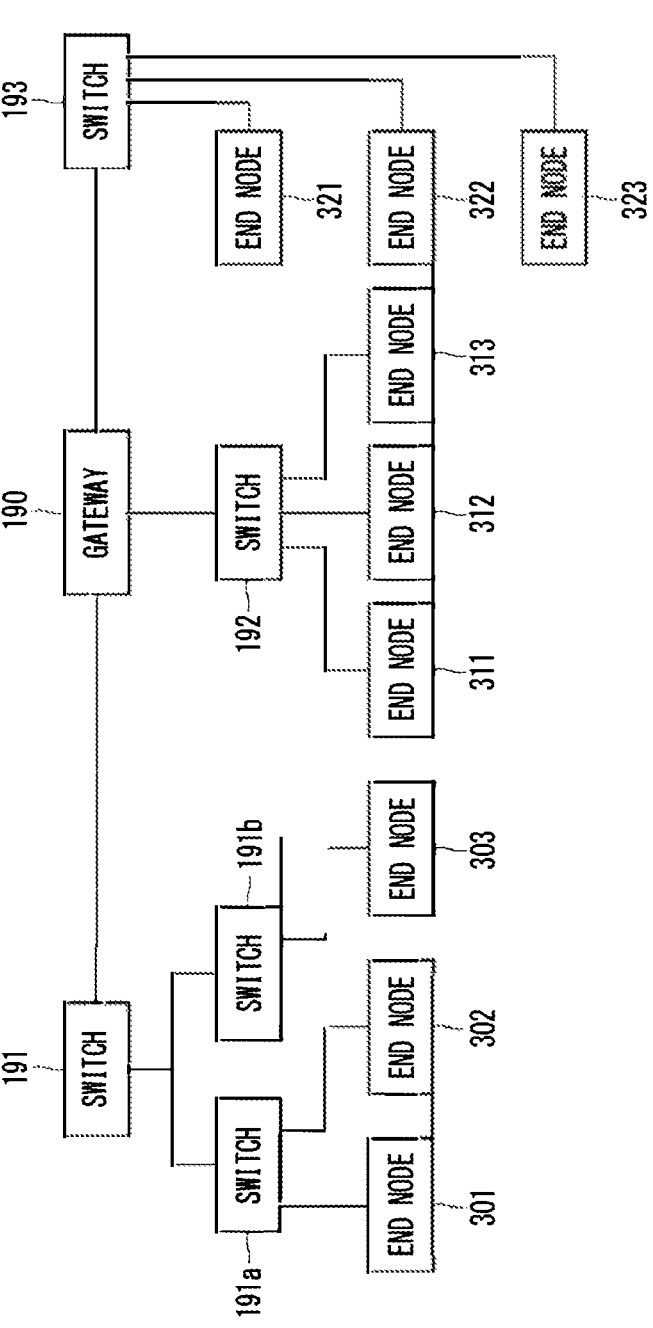
FIG. 1 is a block diagram illustrating a form of a controller area network (CAN) to which an intrusion detection system (IDS) of the present disclosure is applicable.

Since the present disclosure can be modified in various way and have several embodiments, particular embodiments will be illustrated in the drawings and described in detail. However, these are not intended to limit the present disclosure to particular forms of implementation, and it is to be appreciated that the present disclosure includes all changes, equivalents, and substitutes that do not depart from the spirit and technical scope of the present disclosure.

The terms "first," "second," and the like may be used for describing various components, but the components are not limited by the terms. The terms are used only for the purpose of distinguishing one component from another. For example, a first component may be termed a second component, and similarly, a second component may be termed a first component. The term "and/or" includes any and all combinations of a plurality of associated listed items.

As used herein, "at least one of A and B" may mean "only A," "only B," or "A and B." Also, as used herein, "one or more of A and B" may mean "only A," "only B," or "A and B."

When a first component is referred to as being "coupled" or "connected" to a second component, the first component may be directly coupled or connected to the second component, or there may be an intervening component. On the other hand, when a component is referred to as being "directly coupled" or "directly connected" to another component, there is no intervening component.

Terminology used herein is for the purpose of describing particular embodiments only and is not intended to limit the present disclosure. Singular forms include plural forms unless the context clearly indicates otherwise. As used herein, the terms "include," "have," and the like specify the presence of stated features, integers, steps, operations, components, parts, or combinations thereof but do not preclude the presence or addition of one or more other features, integers, steps, operations, components, parts, or combinations thereof.

Unless otherwise defined, all terms including technical or scientific terms used herein have the same meaning as understood by those of ordinary skill in the art. It should be understood that terms defined in a generally used dictionary should be interpreted as having a meaning consistent with their meaning in the context of the related art and are not interpreted with idealized or extremely formal meanings unless explicitly defined herein.

Hereinafter, example embodiments of the present disclosure will be described in detail with reference to the accompanying drawings. In describing the present disclosure, to facilitate overall understanding, like reference numerals will be used for like components, and description of the same components will not be reiterated.

FIG. 1 is a block diagram illustrating a form of a controller area network (CAN) to which an intrusion detection system (IDS) of the present disclosure is applicable.

Referring to FIG. 1, a CAN is a communication method developed to ensure reliability in a vehicle environment in which electrical noise is frequently generated. The CAN has a structure in which several controllers are connected in parallel to exchange data. All controllers sharing a communication line serve as masters and thus may communicate with each other any time. In other words, when data is uploaded to the communication line, any controller may retrieve and use the data whenever necessary. A CAN communication module includes a microcontroller (MCU) and a CAN transceiver and transmits and receives CAN high and CAN low signals through an external CAN bus.

The controllers are connected to each other through a gateway (GW) 190 and at least one of switches 191, 191a, 191b, 192, and 193. Each controller corresponds to any one of end nodes 301, 302, 303, 311, 312, 313, 321, 322, and 323. The GW 190 and each switch may correspond to end nodes. Each switch may be referred to as a "bridge."

The GW 190 constituting a vehicle network may be connected to at least one of the switches 191, 191a, 191b, 192, and 193 and may connect different networks. For example, the GW 190 may connect an end node which supports communication protocols, such as CAN, FlexRay, Media Oriented System Transport (MOST), local interconnect network (LIN), and the like, to a switch which supports the Ethernet protocol.

Each of the switches 191, 191a, 191b, 192, and 193 may be connected to at least one of the end nodes 301, 302, 303, 311, 312, 313, 321, 322, and 323. Each of the switches may connect end nodes to each other and control the end nodes connected thereto.

Each of the end nodes 301, 302, 303, 311, 312, 313, 321, 322, and 323 may be an ECU that controls various devices included in a vehicle. For example, the end nodes 301, 302, 303, 311, 312, 313, 321, 322, and 323 may be individual ECUs such as a display device, a navigation device, an around view monitoring device, and the like included in an infotainment device of the vehicle.

Meanwhile, end nodes constituting the vehicle network, that is, the GW 190, switches, end nodes, and the like, may be connected in a star topology, a bus topology, a ring topology, a tree topology (see FIG. 1), a mesh topology, or the like.

A device and method according to example embodiments of the present disclosure may be applied to the foregoing network topology. However, a device and method according to example embodiments of the present disclosure are not limited to the foregoing network topology and may be applied to at least one selected from among various well-known network topologies.

Figure 2:
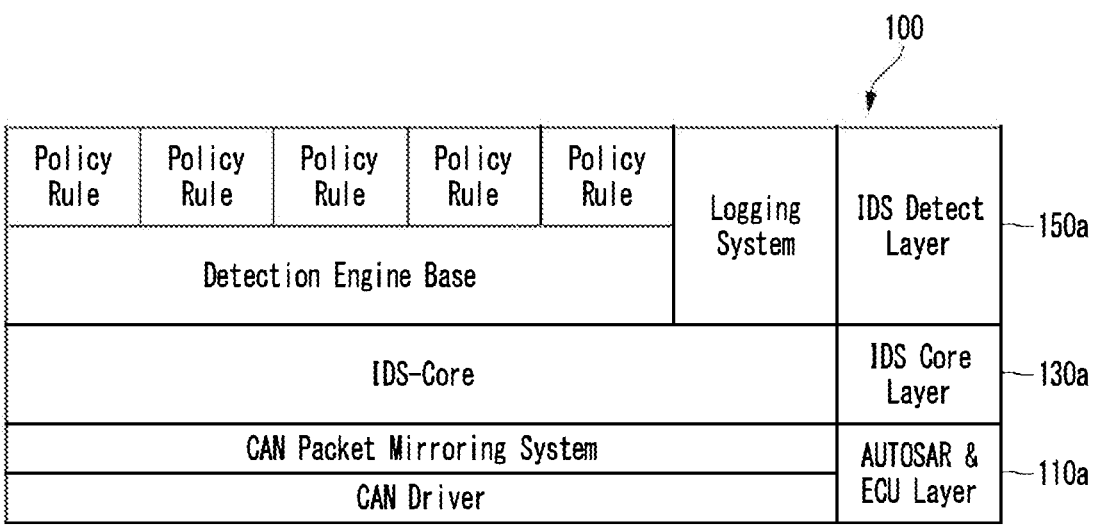
FIG. 2 is a diagram showing a configuration of a CAN IDS according to a comparative example.

FIG. 2 is a diagram showing a configuration of a CAN IDS according to a comparative example.

Referring to FIG. 2, a CAN IDS 100 of a comparative example includes an AUTomotive Open System ARchitecture (AUTOSAR) and ECU layer 110a, an IDS core layer 130a, and an IDS detect layer 150a.

Here, the AUTOSAR and ECU layer 110a includes a CAN driver and a CAN packet mirroring system. The IDS core layer 130 includes an IDS core. The IDS detect layer 150a includes a detection engine base, a plurality of policy rules, and a logging system.

The CAN IDS 100 of the comparative example is applied to general ECU systems. The CAN IDS 100 of the comparative example has a system configuration based on existing AUTOSAR. Here, the CAN packet mirroring is included in a protocol data unit (PDU) router (PduR) of a communication service layer of basic software (BSW) or complex drivers.

Figure 3:
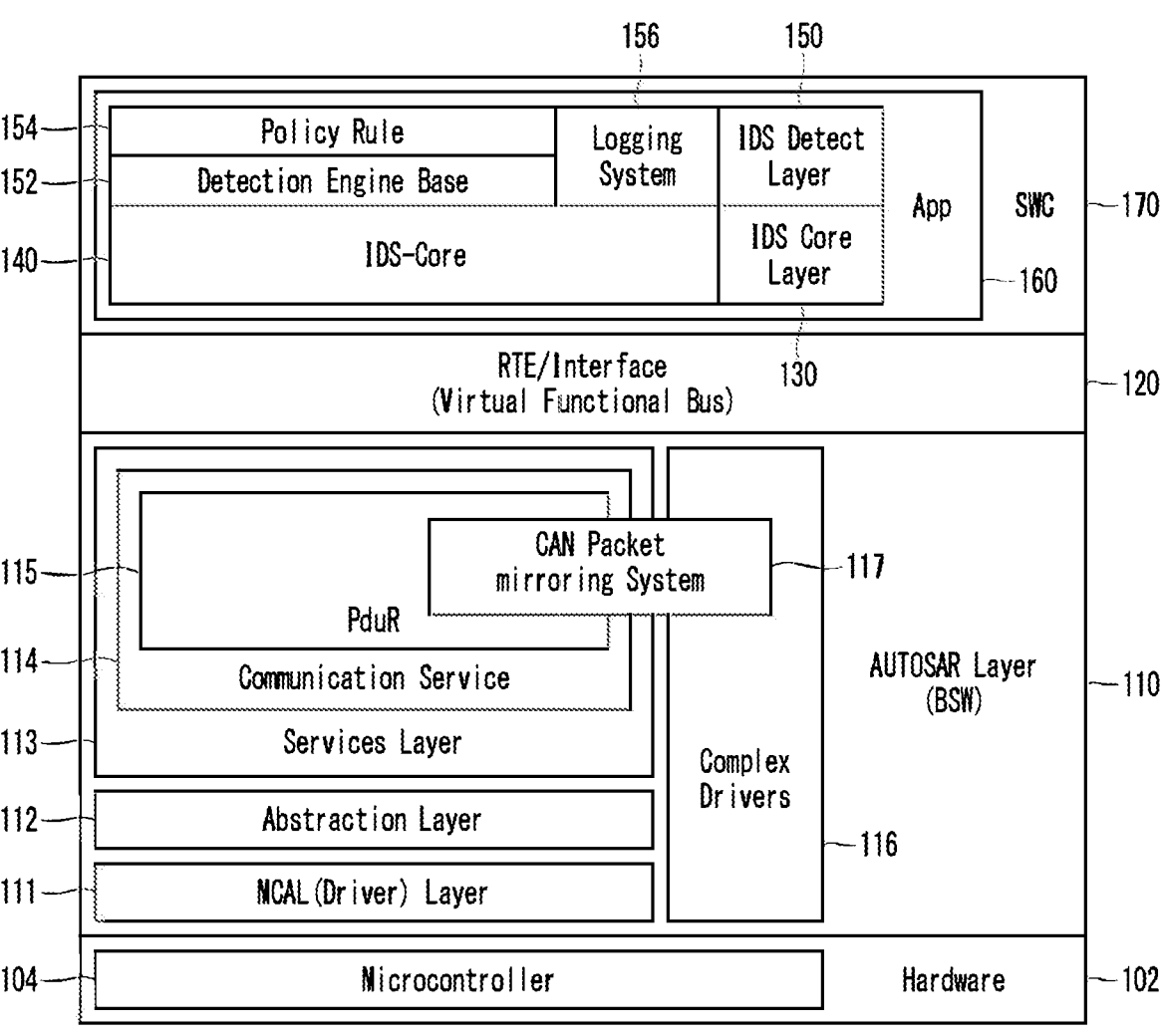
FIG. 3 is a block diagram of a CAN IDS according to an example embodiment of the present disclosure.

FIG. 3 is a block diagram of a CAN IDS according to an example embodiment of the present disclosure.

Referring to FIG. 3, the CAN IDS may include an ECU layer or an AUTOSAR layer 110 installed on hardware 102, a real time environment (RTE) or interface 120 that connects components of the AUTOSAR layer 110 to an application (app) 160 using a virtual functional bus and the like, and an IDS core layer 130 and an IDS detect layer 150 installed on the app 160. The app 160 may be installed on a compiler 170 such as a transpiler, a speedy web compiler, or the like.

The hardware 102 may include an MCU 104. The AUTOSAR layer 110 may include a driver layer 111, such as an MCU abstraction layer (MCAL) or the like, for device drivers, an abstraction layer 112 for ECUs or the like, a services layer 113, complex drivers 116, and a CAN packet mirroring system 117. The services layer 113 may include a communication service layer 114 and a PduR 115.

The IDS core layer 130 may include an IDS core 140. In the present embodiment, the IDS core 140 may be referred to as a "detection engine" at a micro-level. The IDS detect layer 150 may include a detection engine base 152, policy rules 154, and a logging system 156.

The CAN IDS of the present embodiment includes the IDS core layer 130 and the IDS detect layer 150 which have different structures and functions from the comparative example. The IDS core layer 130 and the IDS detect layer 150 are configured to detect and process a CAN message according to new detection rules.

The CAN driver provided in the CAN IDS receives a message from a physical CAN device. The CAN driver initializes the CAN device and receives data from a CAN bus. The CAN driver may be present over regions of the complex drivers 116 and the PduR 115 in the communication service layer 114 of the services layer 113 of the AUTOSAR layer 110. The CAN driver may be referred to as existing in an AUTOSAR PduR region.

The CAN packet mirroring system 117 provided in the CAN IDS copies the message received by the CAN driver to a memory region and performs buffering management to prevent loss of the message. The CAN packet mirroring system 117 may perform a function of generating and managing a CAN message and additional metadata. The CAN packet mirroring system 117 operates as an ECU application program in a system with no classic AUTOSAR platform layer and may be present in a BSW region in a system based on a classic AUTOSAR platform.

Figure 4:
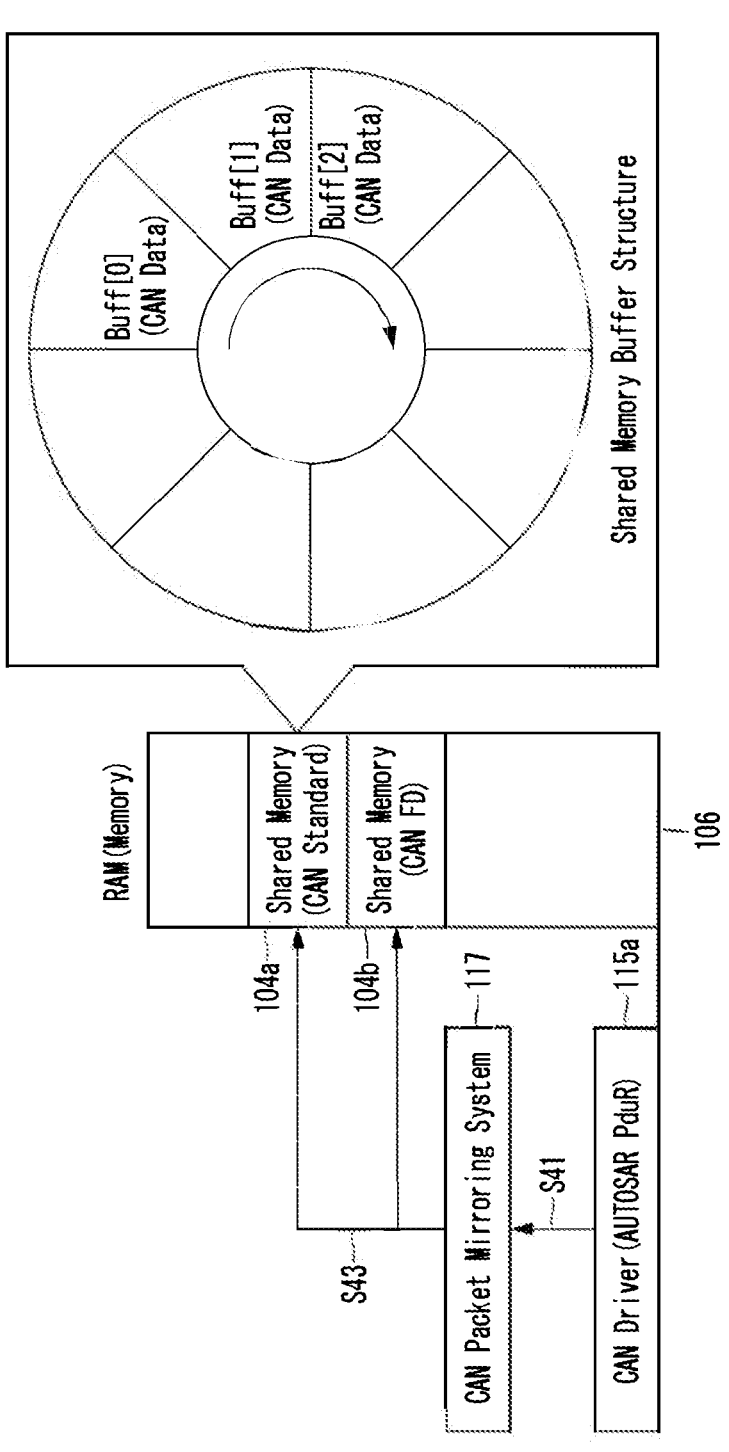
FIG. 4 is a diagram illustrating an operating principle of a CAN packet mirroring system of the CAN IDS of FIG. 3.

FIG. 4 is a diagram illustrating an operating principle of a CAN packet mirroring system of the CAN IDS of FIG. 3.

Referring to FIG. 4, the CAN packet mirroring system 117 may receive a CAN message from a CAN driver 115a present in the AUTOSAR PduR region (S41) and copy and store the received CAN message in a random access memory (RAM) region of a memory 106 (S43). Here, the CAN packet mirroring system 117 may store the message data in a plurality of storage regions which are separately managed in the name of shared memory.

CAN standard message data (hereinafter, "first message data") may be stored and managed in a first storage region 104a, and CAN flexible data (FD) message data (hereinafter, "second message data") may be stored and managed in a second storage region 104b. The first storage region 104a and the second storage region 104b may be referred to as a "first shared memory region" and a "second shared memory region," respectively.

The space of the memory 106, that is, storage regions, may have a circular queue structure, and the buffer size of each storage region may vary depending on a system. For example, a share memory buffer structure in which the storage regions of the memory 106 are formed may include a first buffer buffer [0], a second buffer buffer [1], a third buffer buffer [2], and the like, and each buffer may store CAN data.

CAN data may be stored in a buffer according to a first format of Table 1 or stored in a buffer according to a second format of Table 2. The first format and the second format may have a difference in the size of a message field of a received message. For example, according to a CAN standard, a message field for received CAN message data may have a size of 8 bytes, and a message field for received CAN FD message data may have a size of 64 bytes.

TABLE 1

| Field | Size (bytes) | Description |
|---|---|---|
| Bus | 1 | The ID of a bus through which a message is received (e.g., BCAN-0x00, CCAN-0x01) |
| DLC | 1 | The size of a received message (1 to 8 bytes) |
| ArbID | 2/4 | An 11-bit arbitration ID of a received message |
| Timestamp | 8 | A timestamp format of a received message is a struct timeval format |
| Message | 8 | Received CAN message data |

TABLE 2

| Field | Size (bytes) | Description |
|---|---|---|
| Bus | 1 | The ID of a bus through which a message is received (e.g., BCAN-0x00, CCAN-0x01) |
| DLC | 1 | The size of a received message (1 to 8 bytes) |

TABLE 2-continued

| Field | Size (bytes) | Description |
|---|---|---|
| ArbID | ²/₄ | An 11-bit arbitration ID of a received message |
| Timestamp | 8 | A timestamp format of a received message is a struct timeval format |
| Message | 64 | Received CAN FD message data |

Referring back to FIG. 1, the IDS core 140 of the IDS core layer 130 may perform a function of reading copied data from the CAN packet mirroring system 117 and transmitting the copied data to the detection engine base 152. Here, the IDS core 140 may separately manage a first memory region for storing a policy binary file which is the policy rules 154 of the IDS and a second memory region for storing a buffering table for buffering and storing a CAN message.

Also, the IDS core 140 may include another buffer for retrieving CAN data stored in the memory 106 by the CAN packet mirroring system 117. This buffer may be referred to as an "engine memory."

Figure 5:
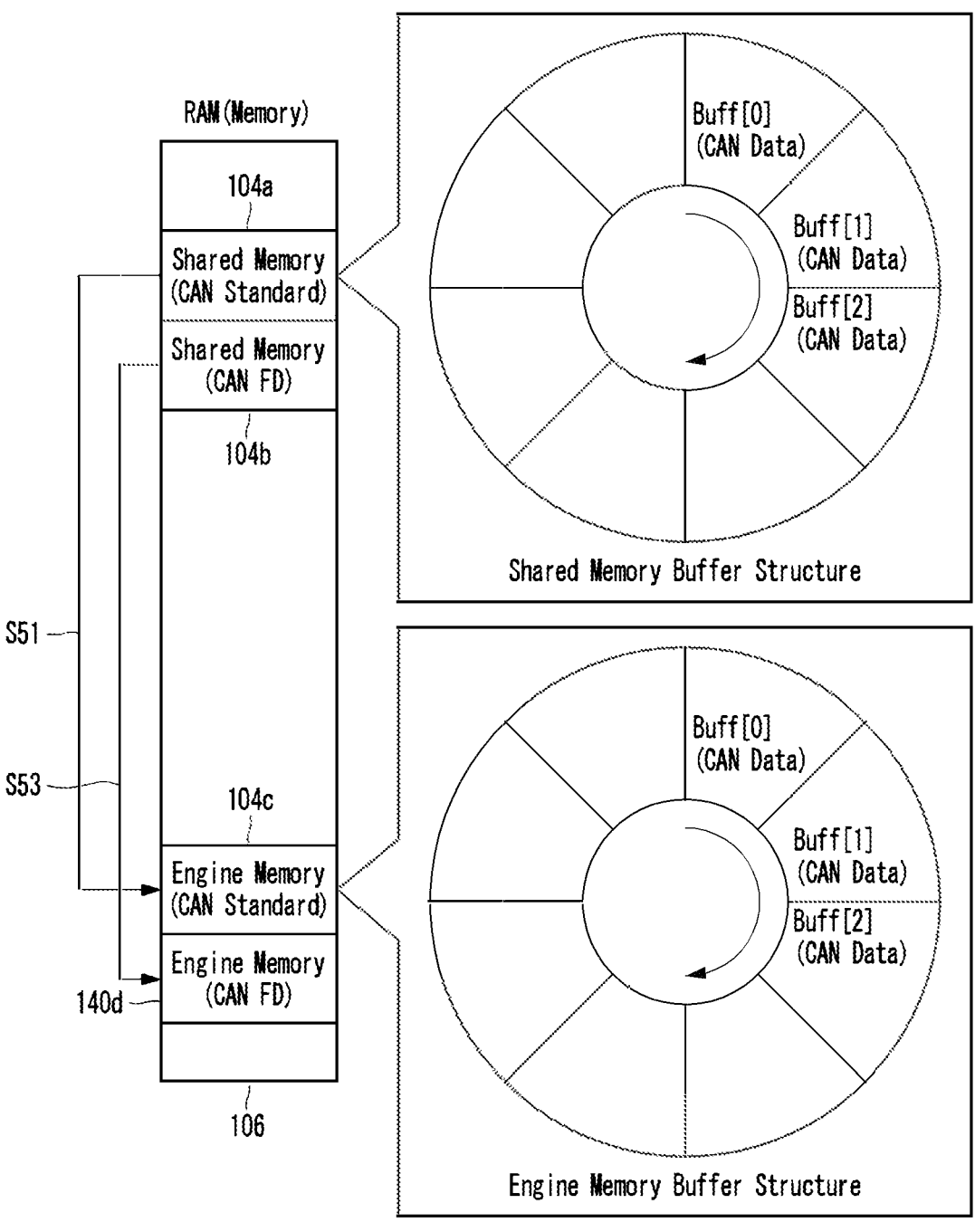
FIG. 5 is a diagram illustrating a structure and an operating principle of an engine memory connected to the CAN packet mirroring system of FIG. 4.

FIG. 5 is a diagram illustrating a structure and an operating principle of an engine memory connected to the CAN packet mirroring system of FIG. 4.

Referring to FIG. 5, the CAN packet mirroring system may copy message data stored in the first storage region 104*a* and the second storage region 104*b*, which are called a shared memory and separately managed, and store the copied message data in a third storage region 104*c* and a fourth storage region 104*d* which are called an engine memory. The third storage region 104*c* and the fourth storage region 104*d* may be referred to as a "first engine memory region," and a "second engine memory region," respectively.

In other words, the CAN packet mirroring system may copy the CAN standard message data stored in the first shared memory region 104*a* and store the copied CAN standard message data in the first engine memory region 104*c* and may copy the CAN FD message data stored in the second shared memory region 104*b* and store the copied CAN FD message data in the second engine memory region 104*d*.

Like the shared memory, each engine memory may have a circular queue structure and store CAN data in the structure which is similar or identical to that of the shared memory.

Before the CAN data is transmitted to the detection engine base, the IDS core (see 140 of FIG. 3) may copy the CAN data from the shared memory and retrieve the copied CAN data to the engine memory. The CAN message retrieved by the engine memory may be stored in the buffering table. To store the CAN message in the buffering table, the IDS core may search a lookup table of policy binary files using bus information and a CAN identification (ID) of the retrieved CAN message. The CAN ID may include or correspond to a lookup key.

The IDS core may store the CAN message in a specific storage region of the memory 106 using previously found buffering table type information of the CAN message. The buffering table type information may include buffer type information, buffer index information, and the like.

The foregoing buffering of the CAN message may be processed using at least one selected from three methods for a case where there is no corresponding information found as a result of searching the lookup table, a case where it is unnecessary to buffer the CAN message, and a case where it is necessary to process a case where the CAN message is buffered.

Figure 6:
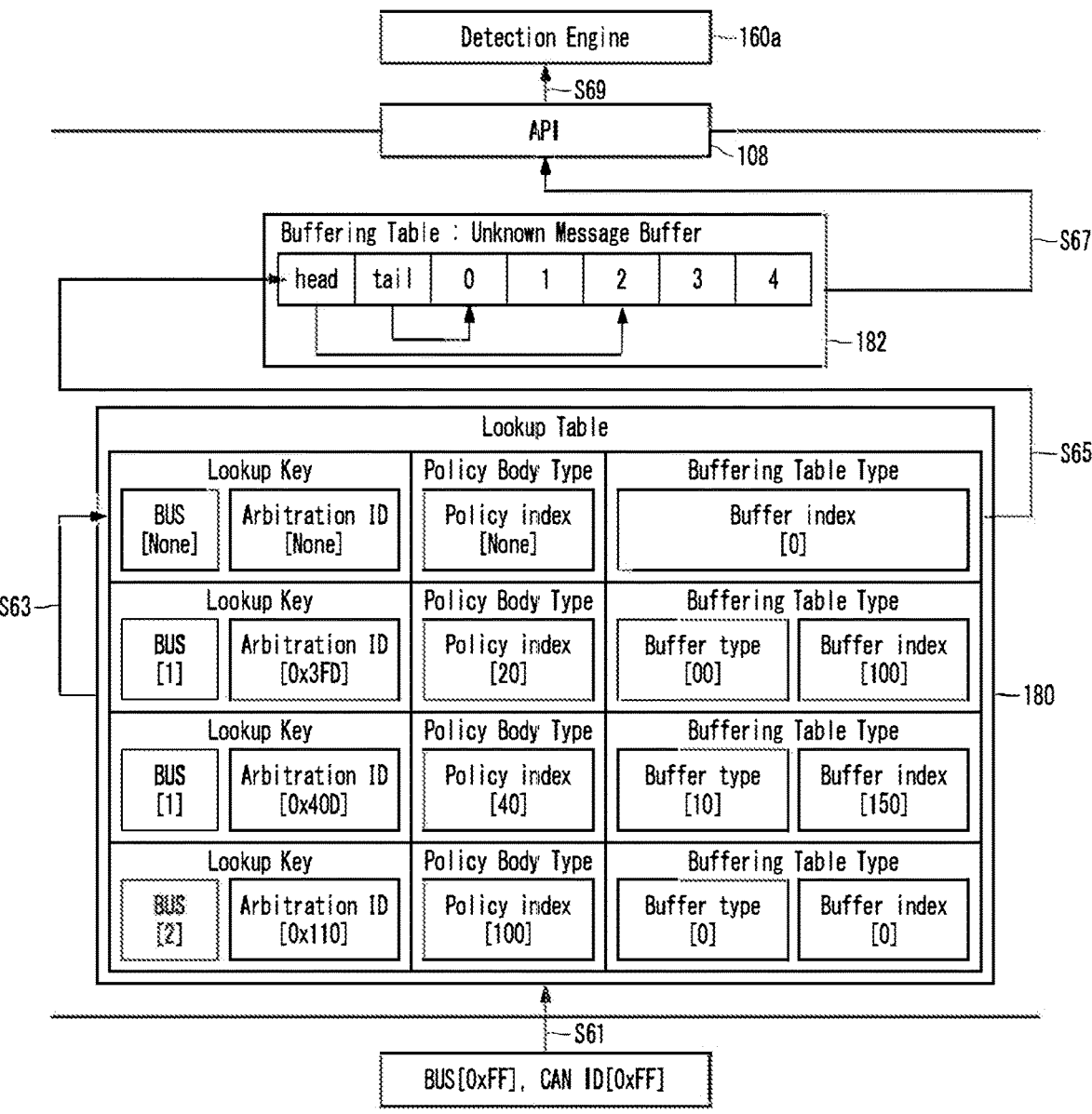
FIG. 6 is a diagram illustrating a buffering process of a CAN message that may be employed in the CAN IDS of FIG. 3.

FIG. 6 is a diagram illustrating a buffering process of a CAN message that may be employed in the CAN IDS of FIG. 3.

Referring to FIG. 6, a buffering process for a case where there is no corresponding CAN message in the lookup table of the policy binary file is illustrated among three processes of buffering a CAN message.

First, the IDS core may search a lookup table 180 for a detection policy through a binary search on the basis of a bus and a CAN ID of the CAN message retrieved from the engine memory (S61). For example, the bus of the CAN message may be shown as BUS (0xFF), and the CAN ID may be shown as CAN ID (0xFF).

The lookup table 180 may store information on a plurality of lookup keys, a plurality of policy body types, and a plurality of buffering table types. Each lookup key may have a field for storing information on a bus and a field for storing information on an arbitration ID. Each policy body type may have a field for storing information on a policy index. Each buffering table type may have a field for storing information on a buffer index and optionally have a field for storing a buffer type.

A message that is not found in the lookup table 180 may be stored in a buffering table 182 of the RAM region using unknown message buffering table information stored in the top of the lookup table 180 (S63 and S65). In other words, when there is no corresponding policy in the lookup table 180, the IDS core may store the CAN message in an unknown message buffer of the buffering table 182 using the unknown message buffering table information (S63 and S65). The unknown message buffer may have a head, a tail, and a plurality of storage regions (see 0 to 4).

When the message is stored, the IDS core may increase a head value of stored messages by one. Then, the IDS core may transmit an address of a currently copied item in the buffering table 182, an address of detection policy rules, and information on a buffer type and a buffer index to the detection engine base through an interface 108 such as an application programming interface (API) or the like (S67 and S69). The address of the detection policy rules may be simply referred to as a "detection policy address," and the buffer index information may include index information of the buffering table 182. In this way, the IDS core may transmit information stored in the buffering table 182 to a detection engine 160*a*. The detection engine 160*a* may be an app (see 160 of FIG. 3).

Figure 7:
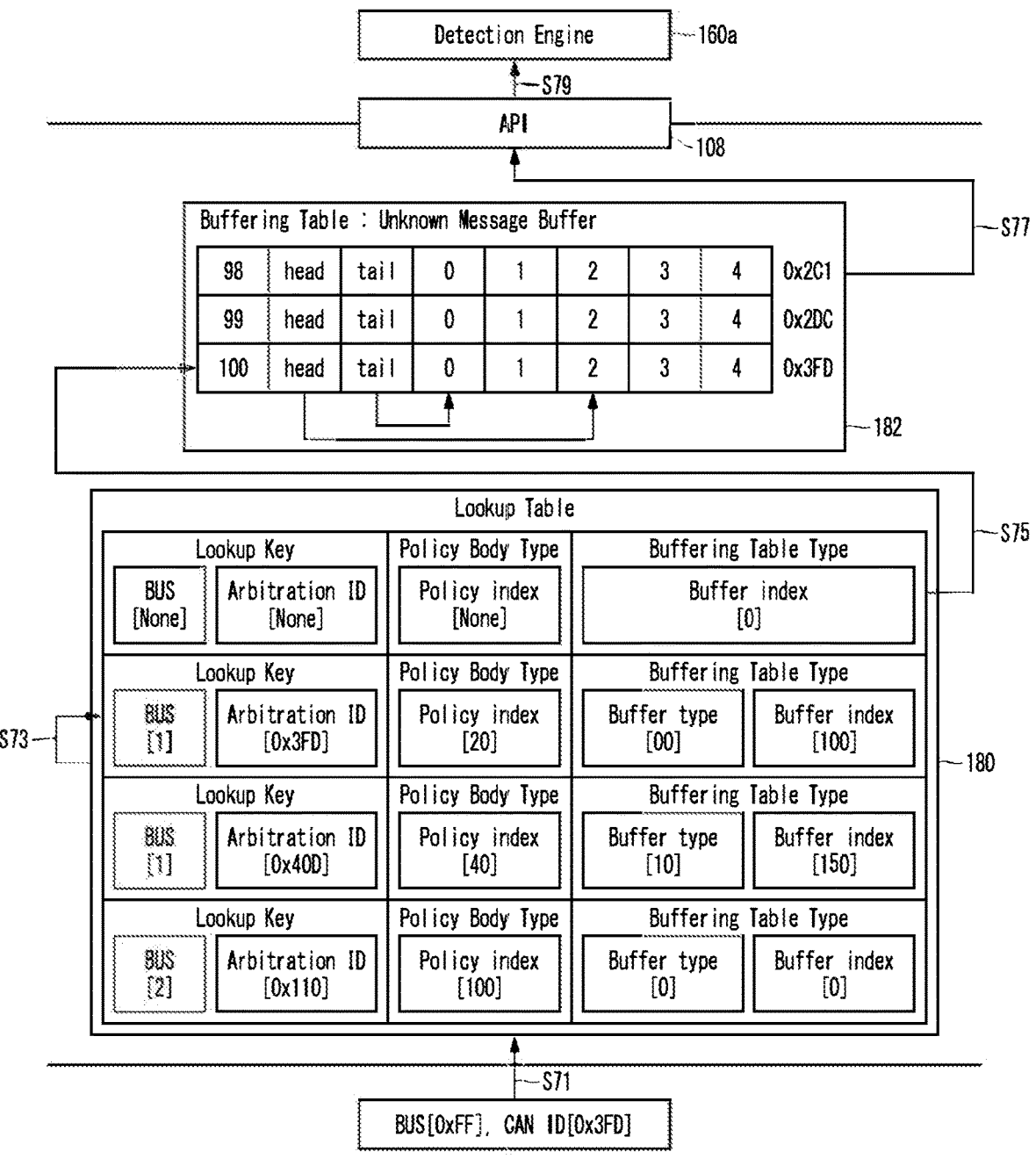
FIG. 7 is a diagram illustrating another buffering process of a CAN message that may be employed in the CAN IDS of FIG. 3.

FIG. 7 is a diagram illustrating another buffering process of a CAN message that may be employed in the CAN IDS of FIG. 3.

Referring to FIG. 7, a buffering process for a case where there is a corresponding CAN message in the lookup table of the policy binary file is illustrated among three processes of buffering a CAN message.

First, the IDS core may search a lookup table 180 for a detection policy through a binary search on the basis of a bus and a CAN ID of the CAN message retrieved from the engine memory (S71). For example, the bus of the CAN message may be BUS (0xFF), and the CAN ID may be CAN ID (0x3FD).

When the CAN message is found in the lookup table 180, the IDS core may store the CAN message in the buffering table 182 of the RAM region using buffering table type information of the CAN message (S73 and S75). The buffering table 182 may include a plurality of unknown message buffers (UMBs). For example, addresses of a 98th UMB, a 99th UMB, and a $100^{th}$ UMB may be set to 0x2C1, 0x2DC, and 0x3FD, respectively. Each unknown message buffer may have a head, a tail, and a plurality of storage regions (see 0 to 4).

When the CAN message is stored, the IDS core may increase a head value of the stored message by one. Also, an address of a currently copied item in the buffering table 182, an address of detection policy rules, and information on a buffer type and a buffer index to the detection engine base of the detection engine 160a through the interface 108 such as an API or the like (S77 and S79). In this way, the IDS core may transmit information stored in the buffering table 182 to the detection engine 160a.

Figure 8:
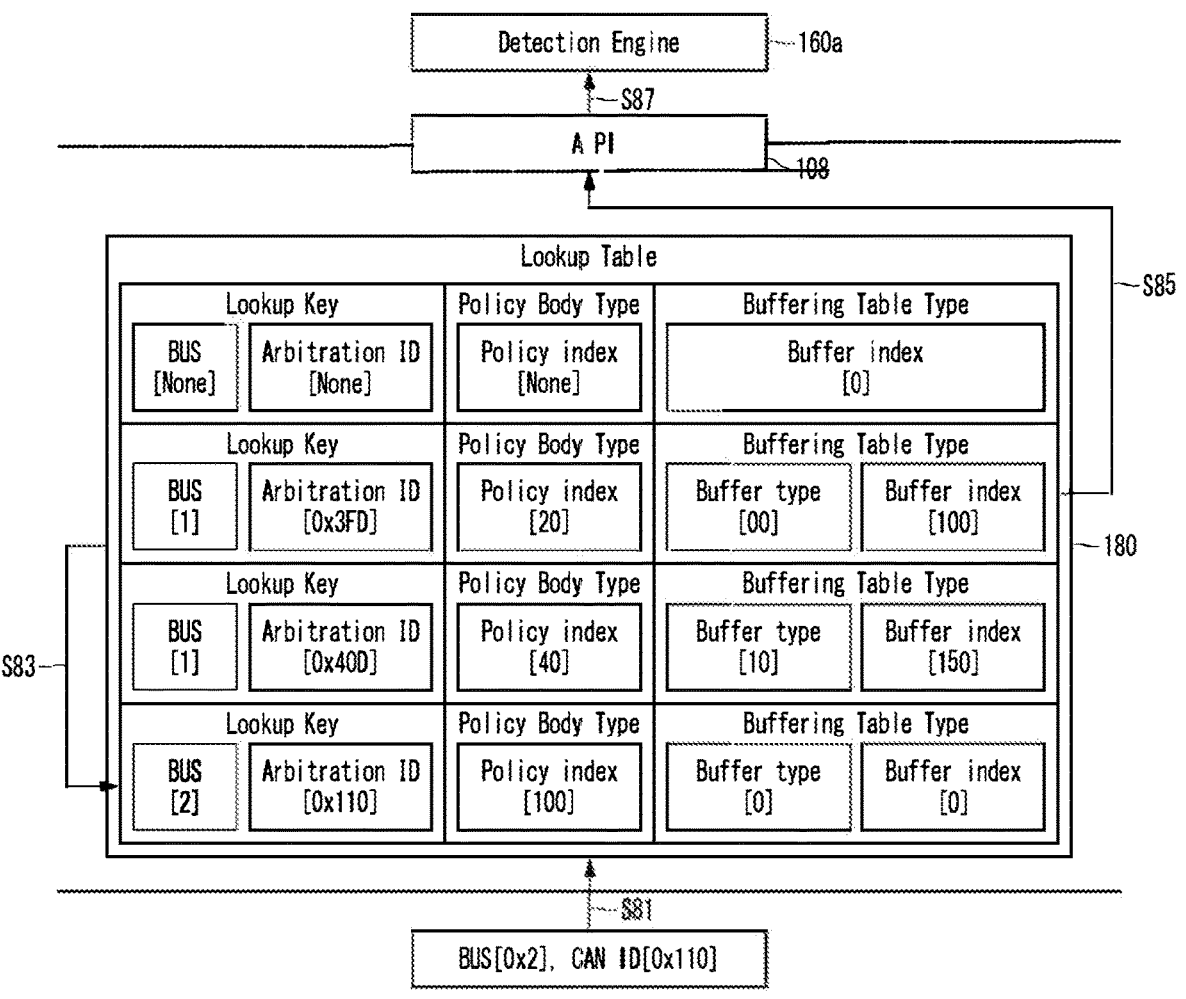
FIG. 8 is a diagram illustrating still another buffering process of a CAN message that may be employed in the CAN IDS of FIG. 3.

FIG. 8 is a diagram illustrating still another buffering process of a CAN message that may be employed in the CAN IDS of FIG. 3.

Referring to FIG. 8, a buffering process for a case where there is a corresponding CAN message in the lookup table of the policy binary file but buffering is unnecessary is illustrated among three processes of buffering a CAN message.

First, the IDS core may search the lookup table 180 using a bus and a CAN ID of the CAN message retrieved from the engine memory (S81). In the search operation, a detection policy may be searched for through a binary search. For example, the CAN message may include BUS (0x2) as bus information and include CAN ID (0x110) as CAN ID information.

When the CAN message is found in the lookup table 180, the IDS core may store the CAN message in the buffering table 182 of the RAM region using buffering table type information of the CAN message (S83).

Here, when buffer index information of the buffering table type information is 0, the IDS core may determine that the CAN message is a message not requiring buffering. The message not requiring buffering may not be stored in the buffering table, and a copied message including a message address of a currently copied item and address information of detection policy rules may be transmitted to the detection engine 160a through the interface 108 such as an API or the like (S85).

The detection engine base (see 152 of FIG. 3) may detect or delete the buffered message using the information received from the IDS core. The detection engine including the detection engine base may detect or delete a message by searching the lookup table using the received information.

Figure 9:
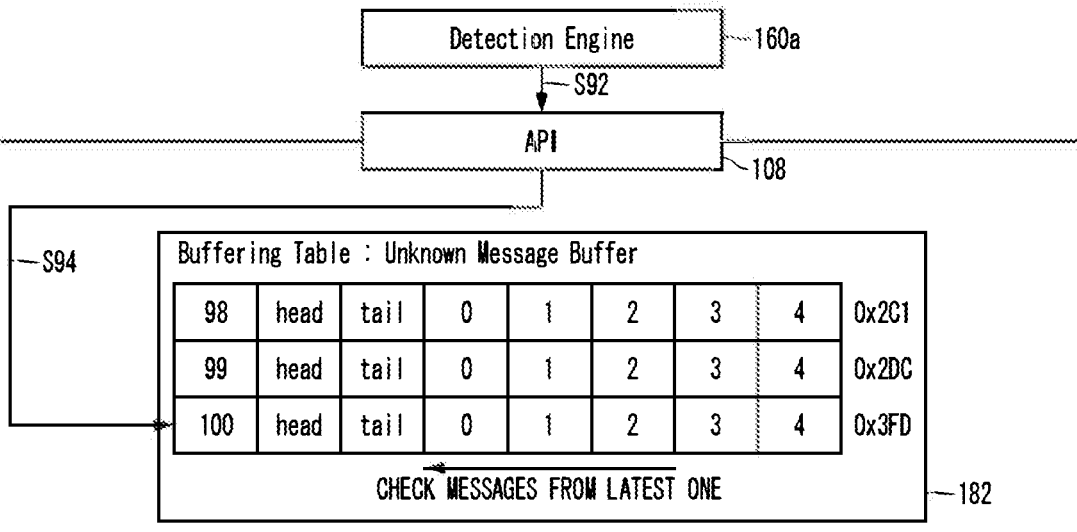
FIG. 9 is a diagram illustrating a CAN message detection procedure in an IDS detect layer that may be employed in the CAN IDS of FIG. 3.

FIG. 9 is a diagram illustrating a CAN message detection procedure in an IDS detect layer that may be employed in the CAN IDS of FIG. 3.

Referring to FIG. 9, the detection engine 160a may detect a CAN message in the lookup table of the policy binary file.

Specifically, the detection engine 160a may detect a CAN message using information of the buffering table 182 corresponding to a CAN message received from the IDS core. When buffer index and buffer type information is received through the interface 108, such as an API or the like, messages in the buffering table 182 may be checked one by one from the latest one on the basis of head and tail information of the buffering table.

For example, the buffering table 182 may include a specific identifier (e.g., buf-5-rec-num). In this case, when information of the buffering table, for example, a buffer type (e.g., 00) and a buffer index (e.g., 100), is transmitted from the detection engine 160a to the interface 108 (S92), the detection engine 160a may move the information of the buffering table 182 to an address where the latest CAN message in the buffering table 182 is stored based on head and tail information of the buffering table 182.

Here, the latest CAN message may be CAN messages sequentially stored at the addresses of 0, 1, and 2 corresponding to the buffer index of 100 with an address of 0x3FD, and the latest CAN message among the late CAN messages may be a CAN message stored at the buffer address of 2 corresponding to the buffer index of 100 in the row of 0x3FD.

Figure 10:
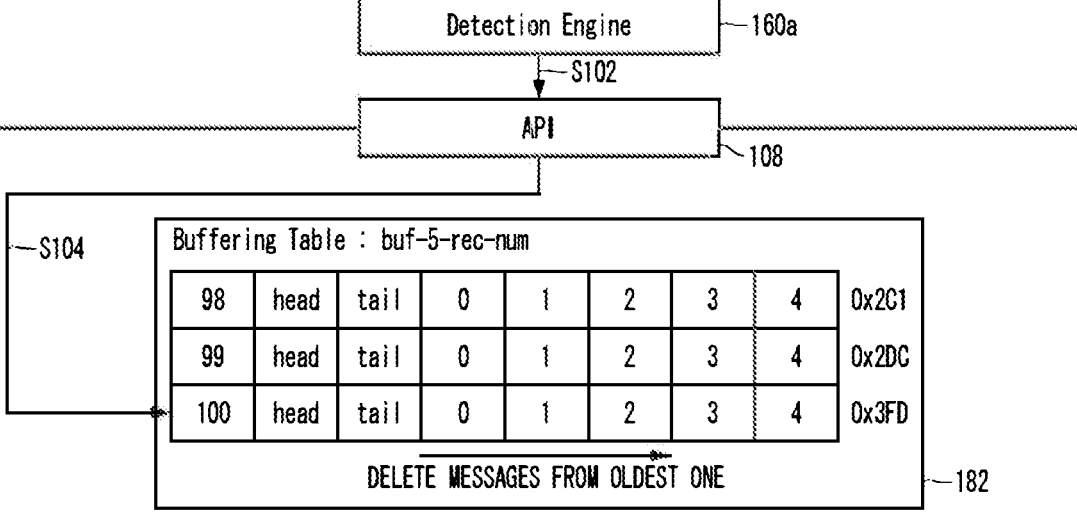
FIG. 10 is a diagram illustrating a CAN message deletion procedure in an IDS detect layer that may be employed in the CAN IDS of FIG. 3.

FIG. 10 is a diagram illustrating a CAN message deletion procedure in an IDS detect layer that may be employed in the CAN IDS of FIG. 3.

Referring to FIG. 10, the detection engine 160a may delete a CAN message in the lookup table of the policy binary file.

Specifically, the detection engine 160a may delete a CAN message using information of the buffering table 182 corresponding to a CAN message received from the IDS core. When buffer index and buffer type information is received from the detection engine 160a through the interface 108, such as an API or the like, messages in the buffering table 182 may be deleted one by one from the oldest one on the basis of head and tail information of the buffering table 182.

For example, the buffering table 182 may include a specific identifier (e.g., buf-5-rec-num), and when information of the buffering table and the number of messages to be deleted are transmitted from the detection engine 160a through the interface 108 (S104), CAN messages may be deleted one by one from the oldest one at the oldest message address in the buffering table 182 using head and tail information of the buffering table 182.

Old CAN messages may be CAN messages sequentially stored at the addresses of 0, 1, and 2 corresponding to the buffer index of 100 with an address of 0x3FD, and the oldest CAN message among the old CAN messages may be a CAN message stored at the buffer address of 0 corresponding to the buffer index of 100 in the row of 0x3FD.

Figure 11:
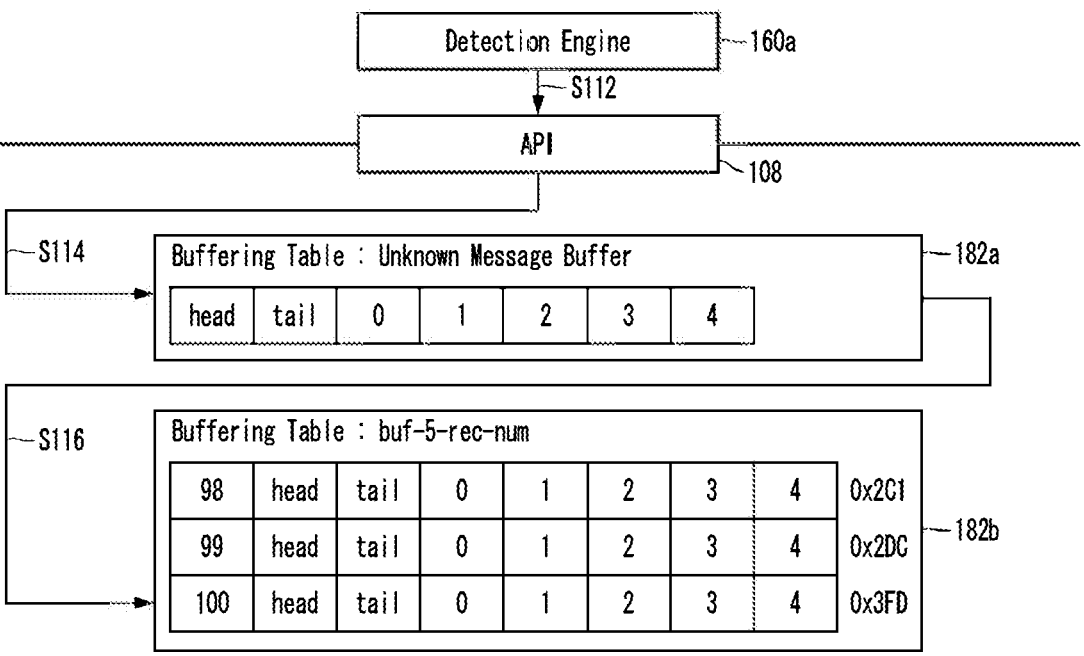
FIG. 11 is a diagram illustrating another CAN message deletion procedure in an IDS detect layer that may be employed in the CAN IDS of FIG. 3.

FIG. 11 is a diagram illustrating another CAN message deletion procedure in an IDS detect layer that may be employed in the CAN IDS of FIG. 3.

Referring to FIG. 11, the detection engine 160a may delete all CAN messages in the lookup table of the policy binary file.

Specifically, the detection engine 160a may delete all CAN messages in a buffering table using information of the buffering table corresponding to a CAN message received from the IDS core. When a request to delete all messages is received from the detection engine 160a through the interface 108, such as an API or the like (S112), all messages in the buffering table 182 may be deleted from starting positions of buffering tables 182a and 182b according to the request to delete all messages and head information and tail information may be initialized (S114 and S116).

The foregoing detection engine may retrieve a CAN message from a buffering table and detect each message on the basis of message detection policy rules of policy body types in the policy binary file stored in a memory, such as a flash memory or the like, through policy index information received from the IDS core. A CAN message detection policy may include a detection policy order for sequentially processing bus detection, message detection, signal detection, and message interval detection (e.g., every second). Such a detection policy for each CAN message is independent, and whether the detection policy applies may be determined depending on a setting of the detection policy.

Figure 12A:
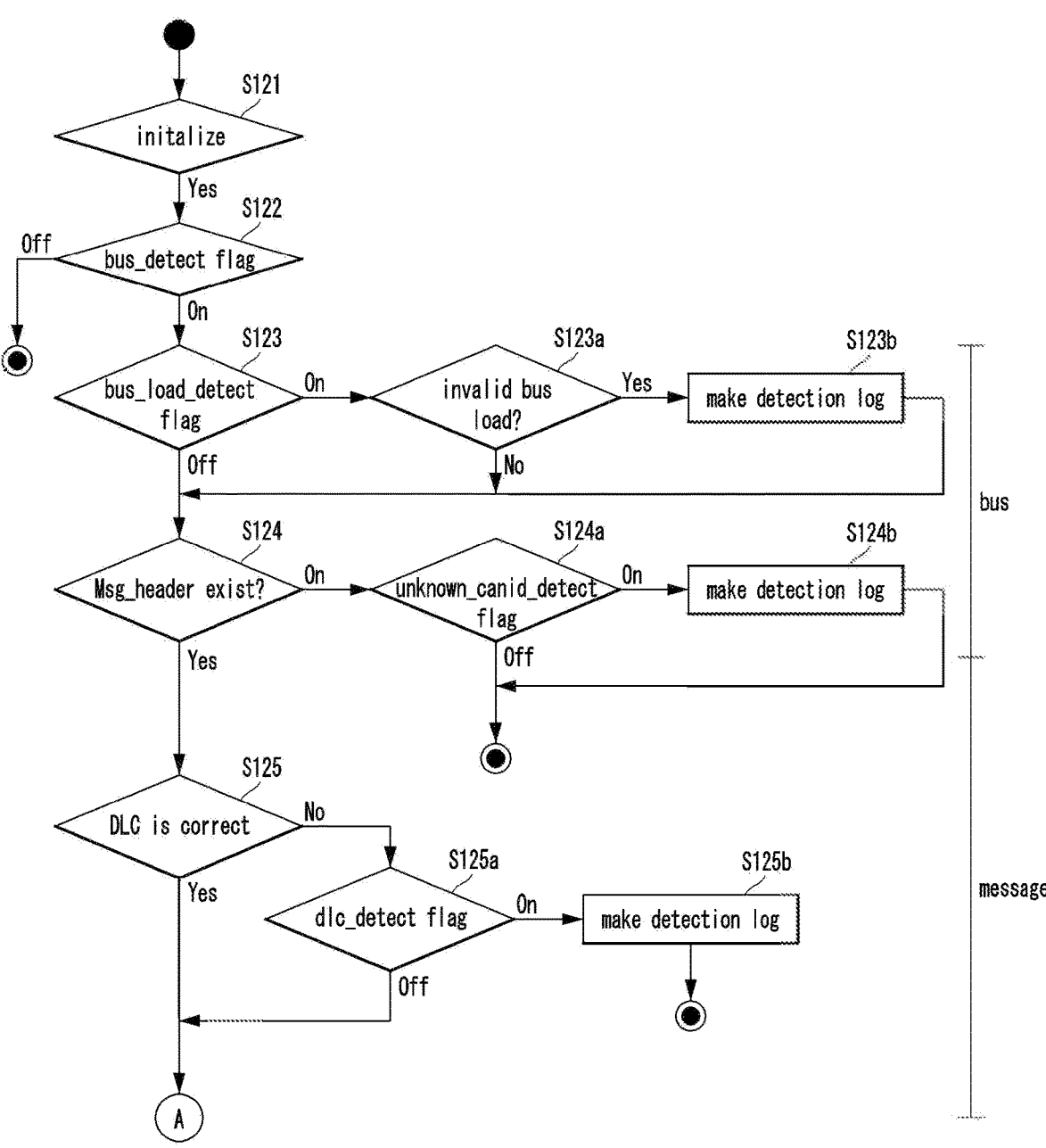
FIGS. 12A to 12C are flowcharts illustrating a process of establishing a CAN message detection policy that may be employed in the CAN IDS of FIG. 3.
Figure 12B:
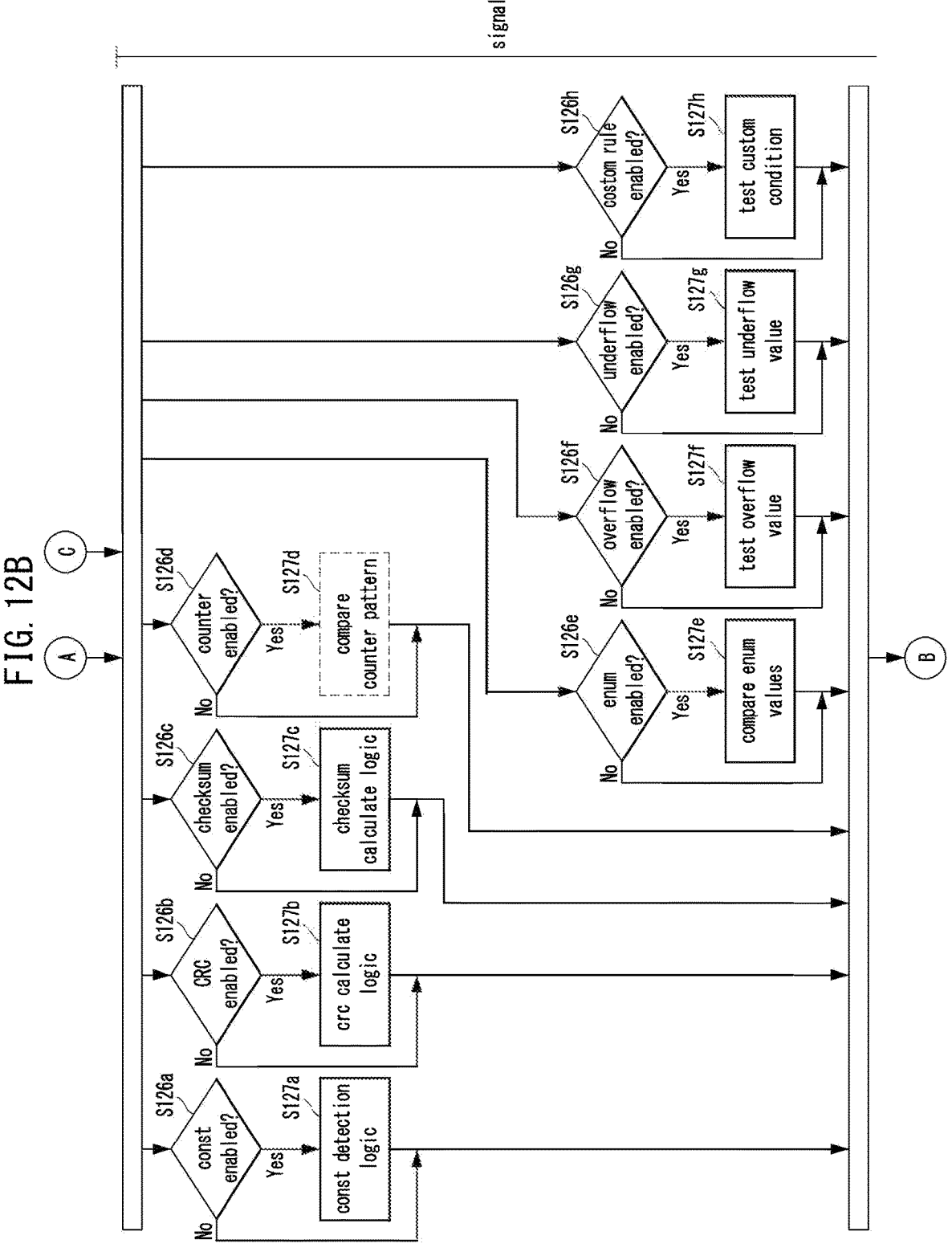
Figure 12C:
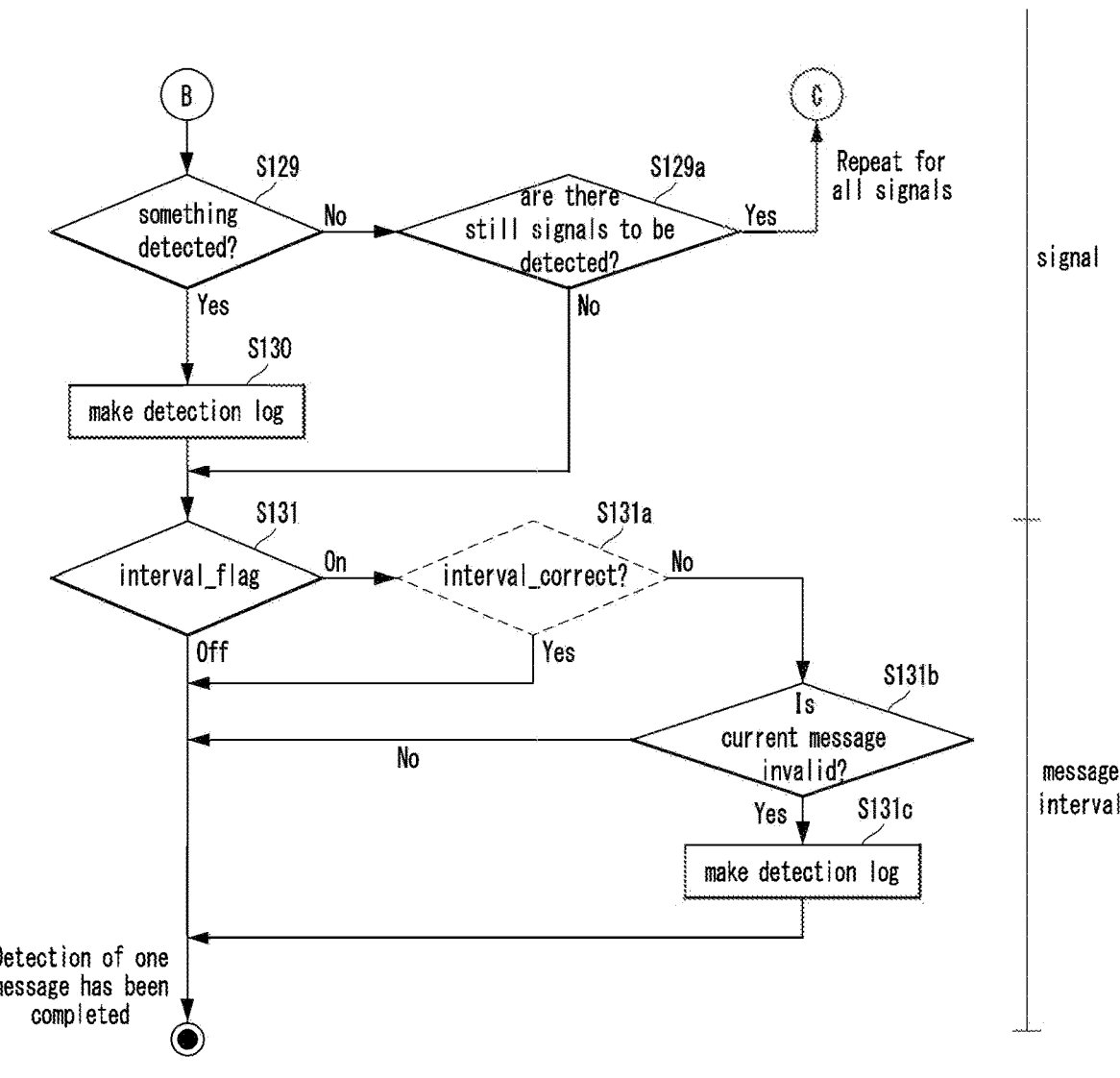

FIGS. 12A to 12C are flowcharts illustrating a process of establishing a CAN message detection policy that may be employed in the CAN IDS of FIG. 3.

Referring to FIG. 12A, when the detection engine starts detection according to a detection policy for each CAN message, the detection engine may initialize detection end (DE) (S121). According to the DE initialization S121, default settings for a bus, a bus arbitration ID, a raw message, a policy header, a policy index, a buffering index, and the like may be initialized. When the DE initialization S121 is not performed normally, the current detection process may be finished according to a preset procedure.

Subsequently, the detection engine may determine whether a bus detection flag bus_detect flag is on or off (S122). When the bus detection flag bus_detect flag is off, the detection process may be finished.

When the bus detection flag bus_detect flag is on, the detection engine may determine whether a bus load detection flag bus_load_detect flag is on or off (S123).

When the bus load detection flag is on, the detection engine may determine whether the bus load detection flag is an invalid bus load (S123a). When the bus load detection flag is an invalid bus load, the detection engine may make a detection log (S123b). On the other hand, when the bus load detection flag is not an invalid bus load, the detection process may proceed to an operation in which the bus load detection flag is determined to be off.

When the bus load detection flag is off, the detection engine may determine whether a message header exists (S124). When a message header does not exist or is null, the detection engine may determine whether an unknown CAN ID detection flag unknown_canid_detect flag is on or off (S124a). When the unknown CAN ID detection flag unknown_canid_detect flag is on, the detection engine may make a detection log (s124b). Meanwhile, when the unknown CAN ID detection flag unknown_canid_detect flag is off or after the detection log is generated, the detection process may proceed to an operation of finishing detection.

The foregoing operations S123, S123a, S123b, S124, S124a, and S124b may correspond to a bus detection procedure.

Meanwhile, when a message header exists (Yes in S124), the detection engine may determine whether a data length code (DLC) is correctly defined (S125). When the DLC is correct, the detection engine may determine whether a DLC detection flag dlc_detect flag is on or off (S125a). When the DLC detection flag dlc_detect flag is on, the detection engine may make a detection log (S125b) and finish the current detection process. On the other hand, when the DLC detection flag dlc_detect flag is off, the detection process may proceed to an operation in which the DLC is determined to be correct.

The foregoing operations S125 and S125a may correspond to a message detection procedure.

Referring to FIG. 12B, the detection engine may determine in parallel or selectively whether constraints are enabled for a CAN message placed on the CAN bus (S126a), whether cyclic redundancy check (CRC) is enabled for the CAN message (S126b), whether a checksum is enabled for the CAN message (S126c), whether a counter is enabled for the CAN message (S126d), whether enumeration (enum) is enabled for the CAN message (S126e), whether overflow is enabled for the CAN message (S126f), whether underflow is enabled for the CAN message (S126g), and whether custom rules are enabled for the CAN message (S126h).

Subsequently, the detection engine may execute constraint detection logic (S127a) when constraints are enabled, execute CRC calculate logic (S127b) when CRC is enabled, execute checksum calculate logic (S127c) when a checksum is enabled, compare counter patterns (S127d) when a counter is enabled, compare enum values (S127e) when enum is enabled, test an overflow value (S127f) when overflow is enabled, test an underflow value (S127g) when underflow is enabled, or test a custom condition (S127h) when custom rules are enabled.

Subsequently, as shown in FIG. 12C, the detection engine may determine whether something is detected (S129). When it is determined that nothing is detected, the detection engine determines whether there are still signals to be detected (S129a). When there are still signals to be detected, the detection process may return to the previous operations S126a to S126h so that the detection engine repeatedly performs the foregoing signal detection process for all signals.

On the other hand, when something is detected, the detection engine may make a detection log (S130). Also, when there is no signal to be detected, the detection process may proceed beyond the operation S130 of making a detection log.

The foregoing detection operations S126a to S126h, S127h, S129, S129a, and S130 may correspond to a signal detection process, and a signal detection result of the detection engine may be placed on the CAN bus.

Referring back to FIG. 12C, the detection engine may determine whether an interval flag interval_flag is on or off (S131). When the interval flag interval flag is on, the detection engine may determine whether an interval is correct (S131a). When the interval is not correct, the detection engine may determine whether the current message is invalid (S131b). When the current message is invalid, the detection engine may make a detection log (S131c).

On the other hand, in each of a case where the interval flag interval_flag is off, a case where the interval value of the interval flag interval_flag is correct, a case where the current message is not invalid, that is, an old message is an anomaly, and a case where a detection log is made because the current message is invalid, the detection engine may operate with detection of one message having been completed.

The foregoing detection operations S131, S131a, S131b, and S131c may correspond to a message interval detection process, or simply an interval detection process.

Figure 13:
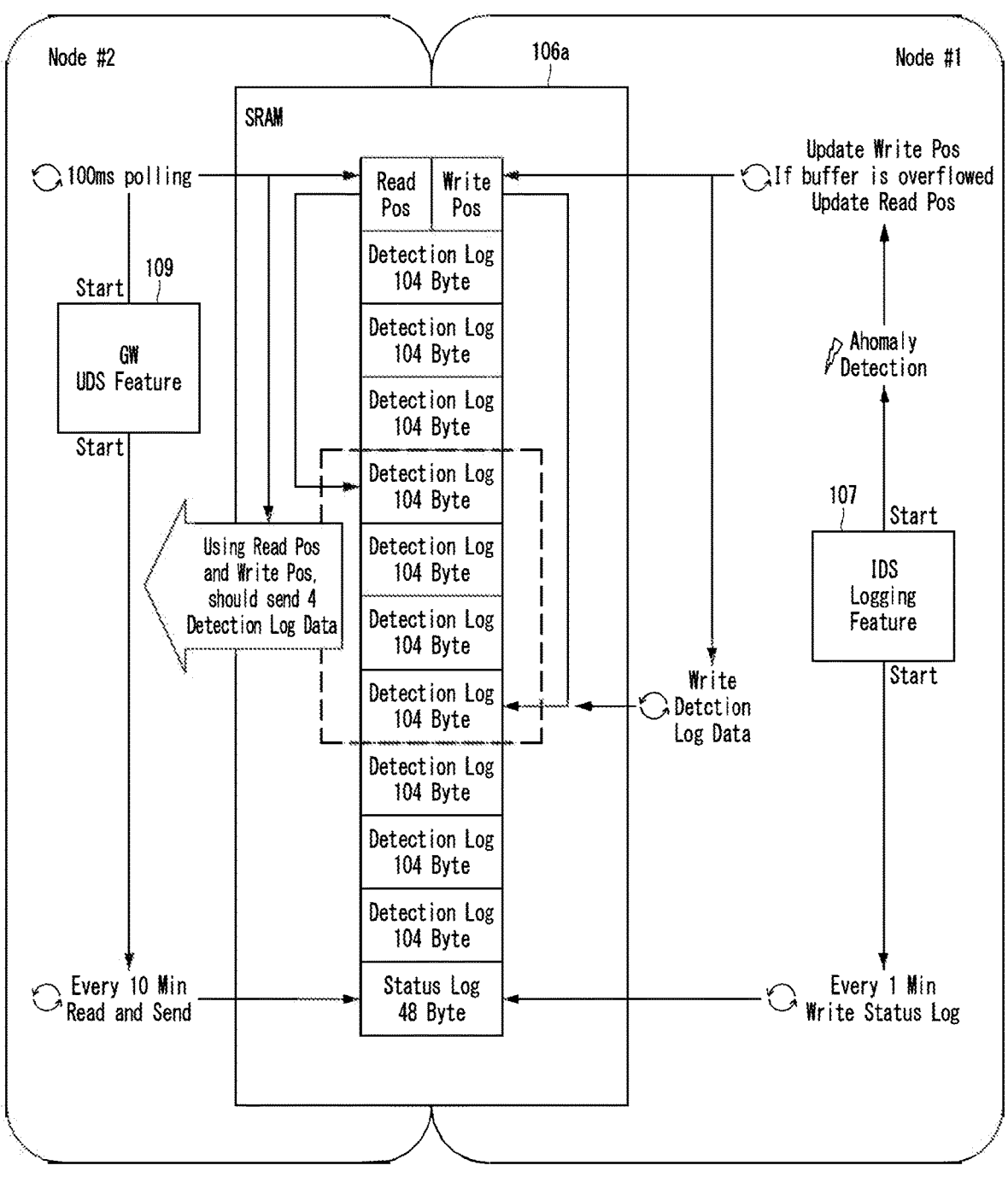
FIG. 13 is a diagram of a logging system of the CAN IDS of FIG. 3.

FIG. 13 is a diagram of a logging system of the CAN IDS of FIG. 3.

Referring to FIG. 13, the logging system may perform a function of managing and writing a detection log received from the IDS core, the detection engine, or the policy rules. Also, the logging system may transmit the written log to an external system such as a cloud server or the like.

To transmit a log message to the external system, the logging system may transmit a detection log record of a CAN message in the vehicle using a data identifier (DID) of a unified diagnostic service (UDS) protocol. To this end, the logging system may share a memory address promised between a first node Node #1 and a second node Node #2.

Here, a memory 106a may include a semiconductor memory such as a static RAM (SRAM) or the like. The detection log record may be stored in a certain size, for example, 106 bytes. In the memory 106a, a read position (pos), a write pos, and a status log having a certain size (e.g., 48 bytes) may be stored.

The first node Node #1 may start an IDS logging feature 107, update the read pos when an anomaly is detected, and update the write pos when the buffer is overflowed. The updated record may be stored at the read pos or the write pos in the memory 106a. Also, the first node Node #1 may store its status in a status log of the memory 106a at intervals of one minute.

The second node Node #2 may start a GW UDS feature 108, read the read pos and the write pos in the memory 106a at intervals of 100 milliseconds (ms), and acquire four pieces of detection log data using the read pos and the write pos. Also, the second node Node #2 may read and store its status in a status log at intervals of ten minutes.

The foregoing logging system may correspond to the IDS logging feature 107 of the first node Node #1, and the GW of the second node Node #2 may be used for providing a log message containing detected log information to the external system.

The foregoing log message may be generated when the IDS, that is, the detection engine, detects an abnormal status in the CAN bus, and the generated log message may be transmitted to the external system through the UDS protocol of the GW. The logging system may have a shared memory address which is shared in advance through a message transmission function using the UDS protocol.

Figure 14:
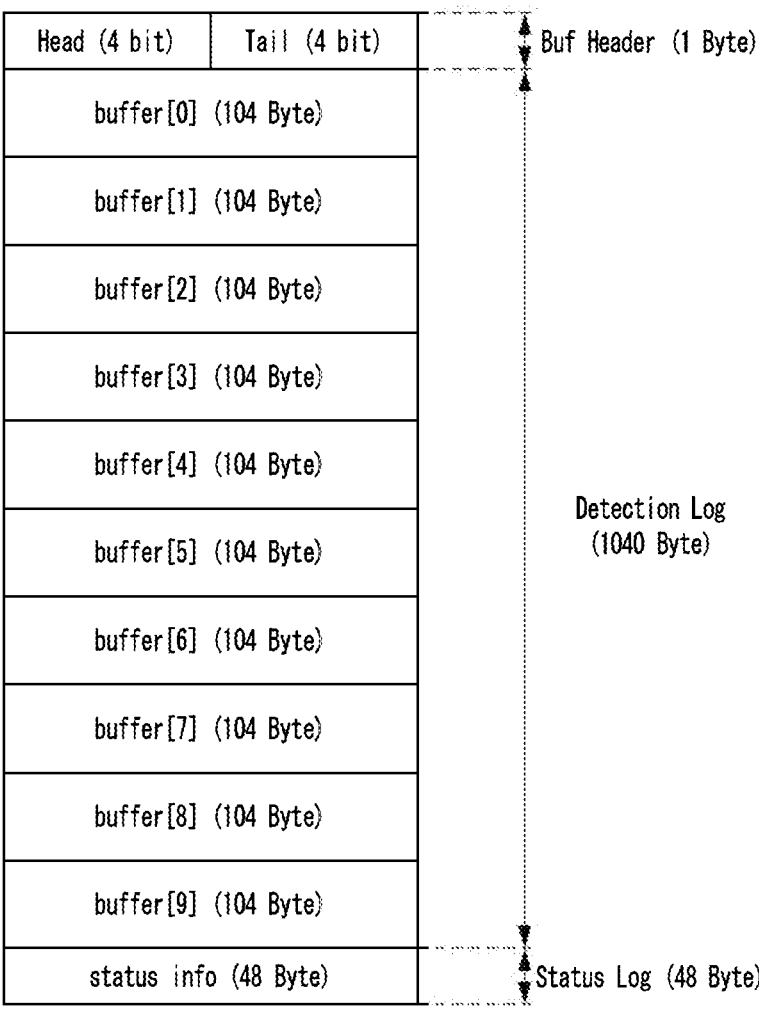
FIG. 14 is a diagram of a message format that may be employed in the logging system of FIG. 13.

FIG. 14 is a diagram of a message format that may be employed in the logging system of FIG. 13.

Referring to FIG. 14, the message format that may be employed in the logging system may include a message format employing the UDS protocol.

The message format may include a buffer header, a detection log, and a status log.

The buffer header may have a size of one byte and include a head and a tail. Each of the head and tail may have a size of four bits but is not limited thereto. In other words, the buffer header may include a write pos corresponding to the head and a read pos corresponding to the tail. The read pos may be managed by a second node, and the write pos may be managed by a first node.

The detection log may have a size of 1,040 bytes and include 10 buffers buffer [0] to buffer [9] each having 104 bytes but is not limited thereto.

When the detection log is made, a detection log pos for writing may be obtained by reading the write pos of the buffer header, a message may be stored at the pos, and then the read pos may be updated with a next detection log pos. In the status log, a current status of the IDS or detection engine may be written every minute. The status log may have a size of 48 bytes, and status information (info) of the IDS or detection engine may be written.

In the foregoing case, the second node may determine whether there is a detection log to be transmitted on the basis of a difference between write positions or read positions of the buffer header of a shared memory every 100 ms. When there are detection logs to be transmitted, the second node may count the number of detection logs to be transmitted and transmit the detection logs to the external system using the UDS protocol.

Also, the second node may read and transmit a status log to a UDS every 10 minutes or in response to a UDS request event. The time may be changed according to a customer's request, and a status value of the GW may be transmitted regardless of whether there is an IDS attack.

FIG. 15 is a diagram illustrating a message structure of a detection log buffer that may be employed in the CAN IDS of FIG. 3.

Referring to FIG. 15, a message structure of a detection log for a detection log buffer includes a one-byte log type. A log type includes a one-bit type and a seven-bit log size.

Here, the type represents a log type, and the log size represents the overall size including the log type. The log type of the detection log may be set to, for example, 0.

Also, the message structure of the detection log may include a one-byte CAN bus number field which represents the number of a CAN bus in which an anomaly is detected, a one-byte violation rule ID field which represents the number of a rule in which an anomaly is detected, a two-byte signal start bit field which represents a signal start pos of a message using a numeral, a one-byte raw message length field which represents a signal length of a CAN message using a numeral, a four-byte message CAN ID field, a four-byte detection time field which represents a time at which an anomaly is detected as a base numeral convertible into year, month, date, hour, minute, and second, an eight-byte detection reason field which represents the content of a detected anomaly using a numeral, a two-byte duplication number field which represents the duplication number of a log using a numeral, a 14-byte reserved field which may be initialized as 0x0 by default and represents a reserved space for additional necessary information, and a 64-byte raw message body field which represents all data of the CAN message.

Figure 16:
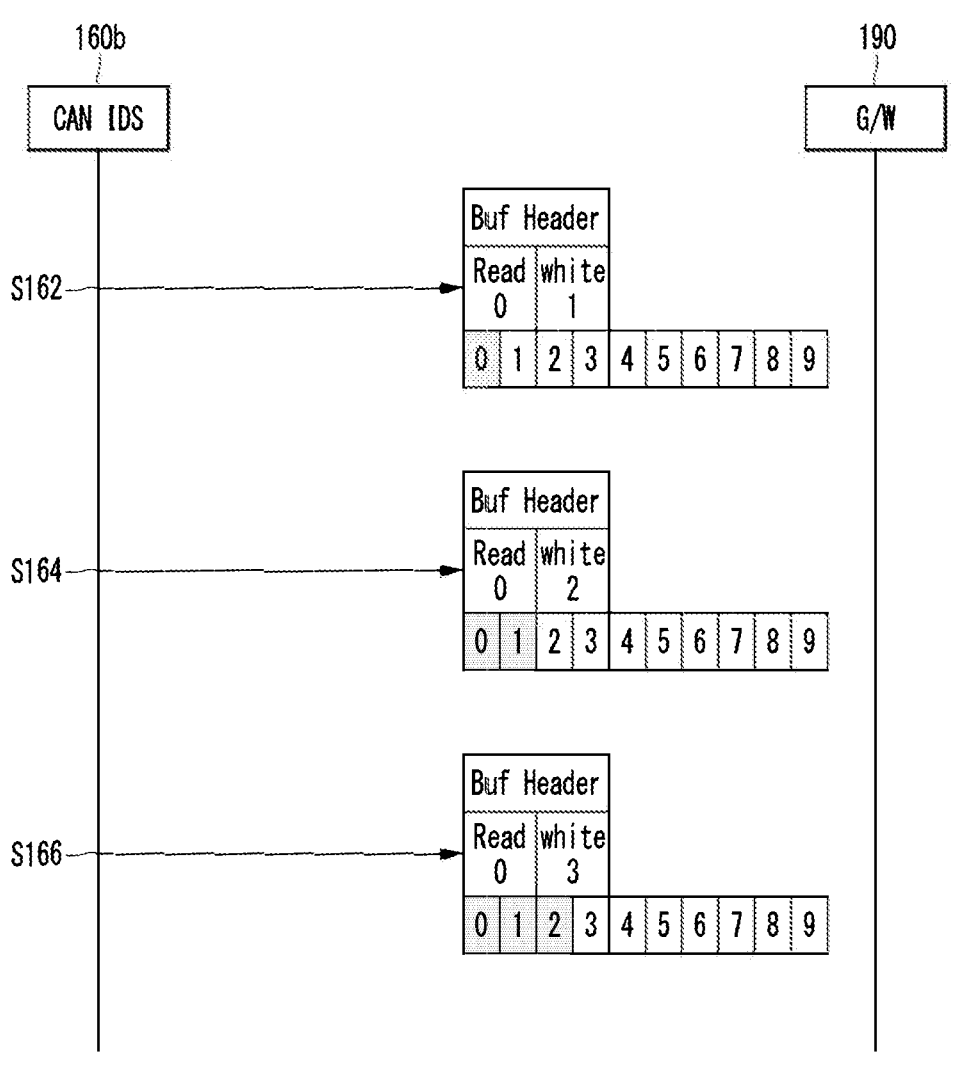
FIG. 16 is a sequence diagram illustrating a detection log-related operating procedure of the CAN IDS of FIG. 3.

FIG. 16 is a sequence diagram illustrating a detection log-related operating procedure of the CAN IDS of FIG. 3.

Referring to FIG. 16, when an anomaly detection message is generated by a CAN IDS 160b, a detection engine writes the anomaly detection message in a detection log buffer of a buffer region of a corresponding memory with reference to a write value of a buffer header.

Specifically, when an anomaly detection message is generated, the CAN IDS 160b may write a first detection log at a read pos in the buffer header (S162). When the read pos is buffer [0], a write pos may be set to buffer [1].

Subsequently, when an anomaly detection message is generated, the CAN IDS 160b may write a second detection log at a read pos in the buffer header (S164). Here, the read pos may be maintained at buffer [0], and a write pos may be set to buffer [2] which is next to the buffer pos where previous message is written.

Subsequently, when an anomaly detection message is generated, the CAN IDS 160b may write a third detection log at a read pos in the buffer header (S166). Here, the read pos may be maintained at buffer [0], and a write pos may be set to buffer [3] which is next to the buffer pos where previous message is written.

Meanwhile, it is necessary for the GW 190 to write a DID data transmission status, and the GW 190 is not allowed to request a DID which has already been read by the external system again. Accordingly, an appropriate DID data transmission procedure is necessary for the GW 190.

Figure 17:
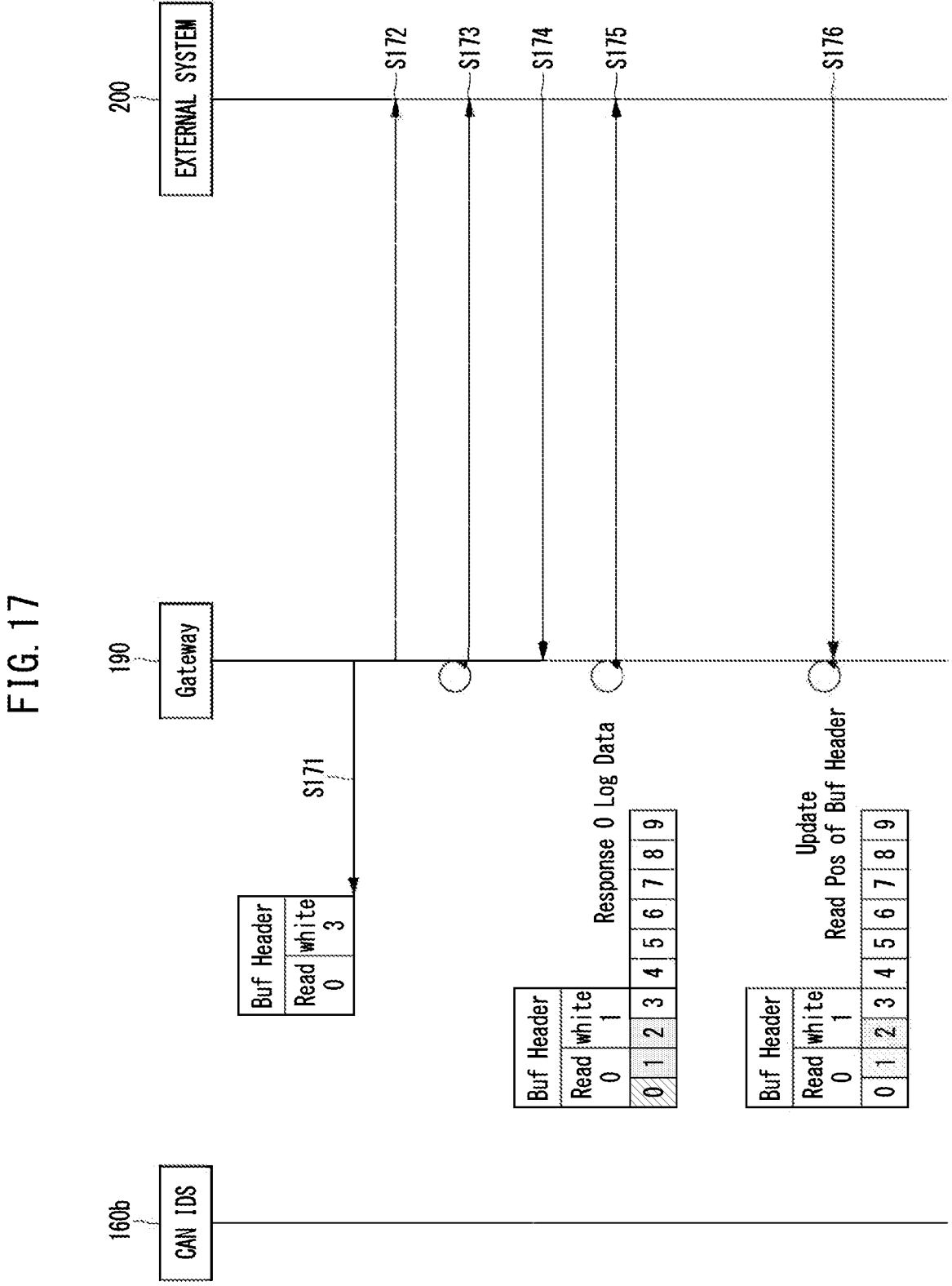
FIG. 17 is a sequence diagram illustrating an operating procedure of a gateway (GW) for the CAN IDS operating procedure of FIG. 16.

FIG. 17 is a sequence diagram illustrating an operating procedure of a GW for the CAN IDS operating procedure of FIG. 16.

Referring to FIG. 17, first, the GW 190 may compare a read value with a write value of a buffer header or check a buffer count using the read value and the write value (S171).

Subsequently, the GW 190 may include as many buffer addresses as a difference between the read value and the write value in a data extraction request signal and transmit the data extraction request signal to an external system 200 (S172). For example, when the calculated buffer address is three, the GW 190 may transmit information on three pieces of log data to be transmitted to the external system 200. The present embodiment illustrates that the GW 190 requests data extraction using up to four DID numbers, but the present disclosure is not limited thereto.

Also, the GW 190 may perform exception processing on over the air (OTA) and diagnosis (DIAG) and generate a request message to read DIDs of three pieces of log data. Then, the GW 190 may transmit an exception processing-related message for remote DIAG to the external system 200 (S173).

The external system 200 may transmit a UDS DID read request message to the GW 190 in response to the request from the GW 190 (S174). In other words, the GW 190 may receive the UDS DID read request message corresponding to the previously transmitted request from the external system 200.

Subsequently, when the UDS DID read request message is received, the GW 190 may read data in a buffer with reference to the read value of the buffer header and transmit the read data to the external system 200 (S175). For example, with the reception of the UDS DID read request message, the GW 190 may read first log data (0 log data or log data #0) from the buffer and provide the first log data to the external system 200 as a response to the UDS DID read request message.

When the message is received from the GW 190, the external system 200 may transmit a success message to the GW 190 (S176). The GW 190 receiving the success message may add one to the read value. In other words, the GW 190 may update a read pos in the buffer header with the reception of the success message.

Meanwhile, a status log including version information, system resource utilization information, and the like of the CAN IDS distributed to vehicles is configured to write data in an allocated address region. Here, the GW 190 may provide one DID storage space to a status log buffer.

FIG. 18 is a diagram illustrating a message structure of a status log buffer that may be employed in the CAN IDS of FIG. 3.

Referring to FIG. 18, a message structure of a status log for a status log buffer is one DID storage space and may include a plurality of fields. First, the message structure of a status log may include a one-byte log type field. A log type includes a one-bit type and a seven-bit log size. Here, the type may represent a log type, and the log size may represent the overall size including the log type. The log type of the status log may be set to, for example, 0.

Also, the message structure of the status log may include a two-byte sequence number field which represents the number of a sequentially generated status message. The sequence number may sequentially increase when a status message is written, and may be initialized when the GW takes prestored sequence numbers.

Also, the message structure of the status log may include a four-byte memory usage field which represents the amount of RAM used by the CAN IDS. The unit of memory usage may be percent (%) but is not limited thereto.

Also, the message structure of the status log may include a four-byte flash usage field which represents the amount of flash memory used for storing policies by the IDS. The unit of the policy binary file in flash usage field may be percent (%). An upper four bytes of a policy binary file may be used.

Also, the message structure of the status log may include a six-byte policy version field which represents policy version information. A policy version may include information of major, minor, release, and the like. For example, major may be represented as 1, minor may be represented as 0, and release information may be 1 which represents a first order, 2 which represents a second order, or the like.

Also, the message structure of the status log may include a six-byte IDS firmware version field which represents IDS firmware version information. The IDS firmware version information may include information of major, minor, release, and the like. For example, major may be represented as 1, minor may be represented as 0, and release information may be 1 which represents a first order, 2 which represents a second order, or the like.

Also, the message structure of the status log may include a 25-byte reserved field which may be initialized as 0x0 by default and represents a reserved space for additional necessary information The foregoing status log may be written through overwriting on the status log buffer every minute.

Figure 19:
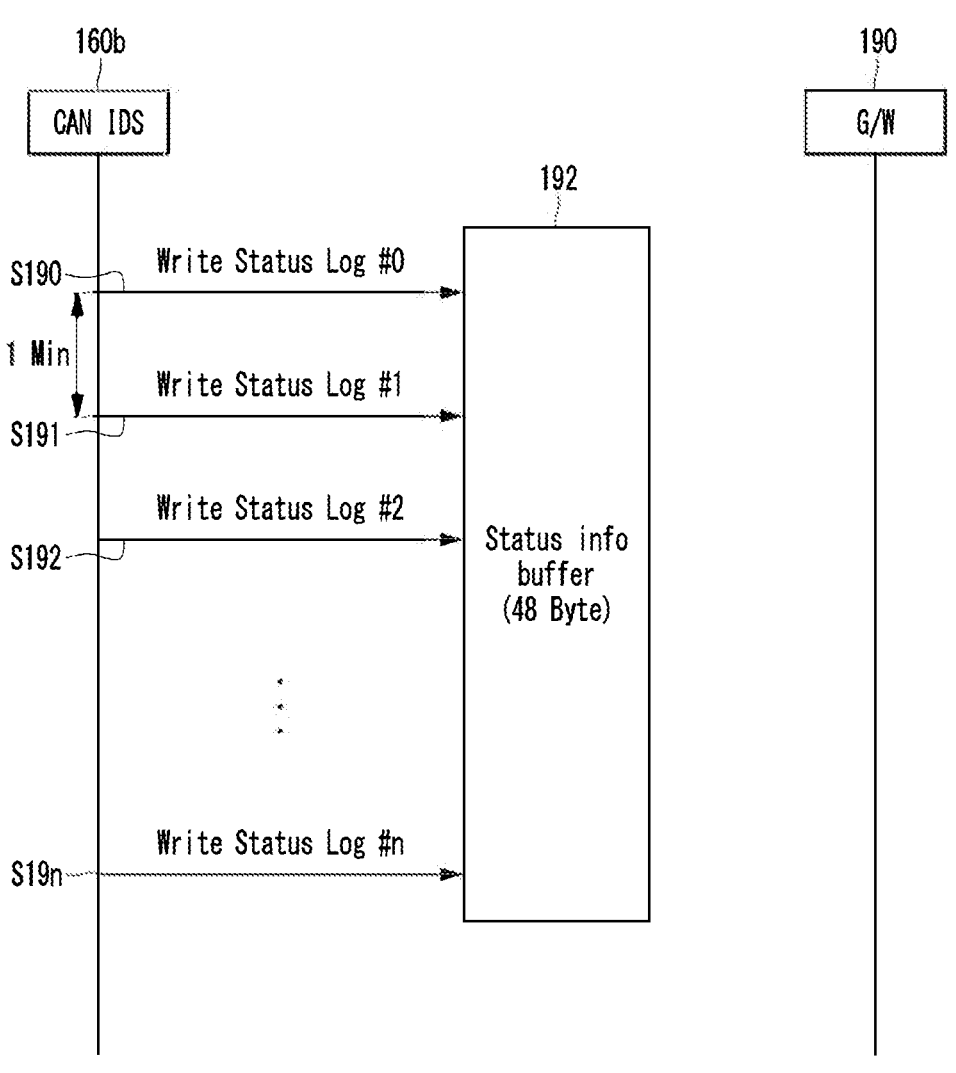
FIG. 19 is a sequence diagram illustrating a status log-related operating procedure of the CAN IDS of FIG. 3.

FIG. 19 is a sequence diagram illustrating a status log-related operating procedure of the CAN IDS of FIG. 3.

Referring to FIG. 19, the CAN IDS 160b or the detection engine of the CAN IDS 160b may periodically write a status log in a status info buffer 192. The size of the status info buffer 192 may be 48 bytes but is not limited thereto.

For example, the CAN IDS 160b may write a first status log #0 in the status info buffer 192 (S190). Then, the CAN IDS 160b may sequentially write a second status log #1, a third status log #2, and an n$^{th}$ status log #n in the status info buffer 192 at intervals of one minute (S191, S192, and S19n). n may be any natural number of 4 or more.

Figure 20:
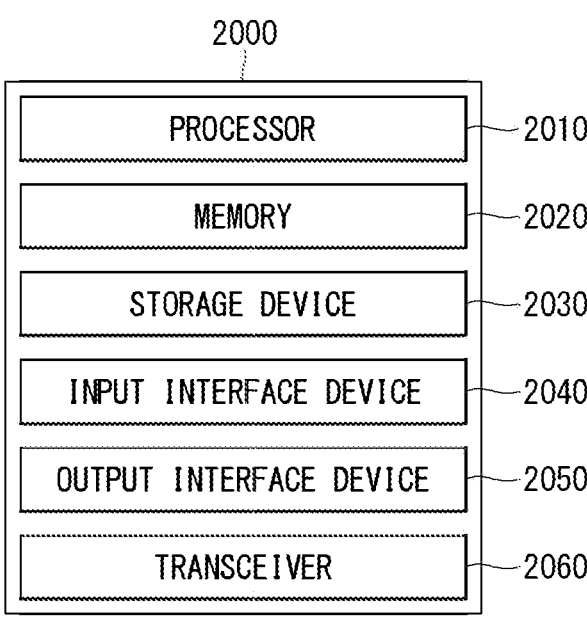
FIG. 20 is a schematic block diagram of a CAN IDS according to another example embodiment of the present disclosure.

FIG. 20 is a schematic block diagram of a CAN IDS according to another example embodiment of the present disclosure.

Referring to FIG. 20, a CAN IDS 2000 may include at least one processor 2010, a memory 2020, and a transceiver 2060 which is connected to a network and performs communication. The CAN IDS 2000 may further include a storage device 2030, an input interface device 2040, an output interface device 2050, and the like. Components included in the CAN IDS 2000 may be connected through a bus and communicate with each other.

The processor 2010 may be a central processing unit (CPU), a graphics processing unit (GPU), or a dedicated processor for performing methods according to example embodiments of the present disclosure.

Each of the memory 2020 and the storage device 2030 may be at least one of a volatile storage medium and a non-volatile storage medium. For example, the memory 2020 may be at least one of a read-only memory (ROM) and a random-access memory (RAM).

The processor 2010 may execute a program command stored in at least one of the memory 2020 and the storage device 2030. The program command may include at least one command, and the at least one command may be included in a software module or program.

The input interface device 2040 may include at least one selected from among input devices, such as a keyboard, a microphone, a touchpad, a touchscreen, and the like, and an input signal processing part which maps a signal input through the at least one input device to a prestored command or processes the signal.

The output interface device 2050 may include an output signal processing part which maps a signal output according to control of the processor 2010 to a prestored signal form or level or processes the signal and at least one output device which outputs a signal or information in the form of vibrations, light, or the like according to a signal of the output signal processing part. The at least one output device may be at least one selected from among a speaker, a display device, a printer, an optical output device, a vibration output device, and the like.

The transceiver 2060 may include a communication interface or a sub-communication system for a local wireless network or cable connection, communication with a satellite, wired or wireless communication with a general base station, or a connection of a mobile edge core network or core network with an ideal backhaul link, a non-ideal backhaul link, or the like.

According to the present disclosure, it is possible to effectively detect an attacker's intrusion through a CAN on a vehicle CAN-based platform.

The foregoing methods according to the present disclosure may be implemented in the form of program commands that are executable by various computing devices and written on a computer-readable medium. The computer-readable medium may include program commands, data files, data structures, and the like solely or in combination. Program commands written on the computer-readable medium may be those specially designed for the present disclosure or those well-known and available to those of ordinary skill in the computer software field.

Examples of the computer-readable medium include hardware devices specially designed for storing and executing program commands such as a ROM, a RAM, a flash memory, and the like. Examples of program commands include not only machine language code which is generated by a compiler but also high-level language code which is executable by a computer using an interpreter or the like. The foregoing hardware devices may be configured to operate as at least one software module to perform operations of the present disclosure, and vice versa.

Some aspects of the present disclosure have been described above in the context of a device but may also be described using a corresponding method. Here, blocks or the device correspond to operations of the method or characteristics of the operations of the method. Similarly, aspects described above in the context of a method may be described using corresponding blocks or items or characteristics of a corresponding device. Some or all operations of the method may be performed, for example, by (or using) a hardware device, such as a microprocessor, a programmable computer, or an electronic circuit. In some embodiments, at least one of important operations of the method may be performed by such a device.

In embodiments, a programmable logic device, such as a field programmable gate array (FPGA), may be used to perform some or all functions of the methods described herein. In embodiments, the FPGA may operate in conjunction with a microprocessor to perform one of the methods described herein. Generally, the methods are preferably performed by a certain hardware device.

Although the present disclosure has been described above through embodiments, those of ordinary skill in the art should understand that various modifications and changes can be made without departing from the spirit and scope of the present disclosure described in the following claims.

What is claimed is:

1. An operating method of a controller area network (CAN) intrusion detection system (IDS) including an electronic control unit (ECU) layer or AUTomotive Open System ARchitecture (AUTOSAR) layer, a real time environment (RTE) or interface connecting components of the AUTOSAR layer to an application (app), and an IDS core layer and IDS detect layer installed on the app, the operating method comprising:

receiving, by a CAN packet mirroring system of the AUTOSAR layer, a CAN message from a CAN driver which exists in an AUTOSAR protocol data unit (PDU) router (PduR) region of the AUTOSAR layer;

storing, by the CAN packet mirroring system, the received CAN message in a plurality of storage regions of a memory;

reading, by an IDS core of the IDS core layer, data copied by the CAN packet mirroring system and transmitting the copied data to a detection engine base of the IDS core;

separately managing, by the IDS core of the IDS core layer, a first memory region for storing a policy binary file which is policy rules of the IDS and a second memory region for storing a buffering table for buffering and storing the CAN message; and copying, by the CAN packet mirroring system, CAN standard message data stored in a first shared memory region of the memory to store the copied CAN standard message data in a first engine memory region and copying CAN flexible data (FD) message data stored in a second shared memory region of the memory to store the copied CAN FD message data in a second engine memory region; and copying, by the IDS core, the CAN data from a shared memory and retrieving the copied CAN data to an engine memory before the copied CAN data is transmitted to the detection engine base;

wherein the CAN standard message data and the CAN FD message data have different lengths, and the CAN message retrieved by the engine memory is stored in the buffering table;

wherein the shared memory is configured to buffer detection log data and support concurrent access by a plurality of nodes, and the detection engine base is configured to copy at least one CAN message from the shared memory into the engine memory that is separate from the shared memory, and to perform detection processing based on the copied CAN message stored in the engine memory.

2. The operating method of claim 1, further comprising searching, by the IDS core, a lookup table of policy binary files using bus information and a CAN identification (ID) of the previously retrieved CAN message to store the CAN message in the buffering table.

3. The operating method of claim 2, further comprising storing, by the IDS core, the CAN message in a specific storage region of the memory using previously found buffering table type information of the CAN message, wherein the buffering table type information includes buffer type information and buffer index information.

4. The operating method of claim 3, further comprising searching, by the IDS core, the lookup table and processing the CAN message as at least one of a case where there is no corresponding information, a case where it is unnecessary to buffer the CAN message, and a case where it is necessary to process a case where the CAN message is buffered.

5. The operating method of claim 4, further comprising searching, by the IDS core, the lookup table for a detection policy through a binary search on the basis of the bus and the CAN ID of the CAN message retrieved from the engine memory.

6. The operating method of claim 5, further comprising, when there is no corresponding policy in the lookup table, storing, by the IDS core, the CAN message in an unknown message buffer of the buffering table using unknown message buffering table information;

increasing, by the IDS core, a head value of the stored message by one; and transmitting, by the IDS core, an address of a currently copied item in the buffering table, an address of detection policy rules, and information on a buffer type and a buffer index to the detection engine base through the interface.

7. The operating method of claim 5, further comprising, when a corresponding detection policy is found in the lookup table, storing, by the IDS core, the corresponding CAN message in the buffering table of the memory using buffering table type information of the corresponding CAN message;

increasing, by the IDS core, a head value of the stored message by one; and transmitting, by the IDS core, an address of a currently copied item in the buffering table, an address of detection policy rules, and information on a buffer type and a buffer index to the detection engine base through the interface.

8. The operating method of claim 5, further comprising, when a detection policy corresponding to the CAN message is found in the lookup table, storing, by the IDS core, the corresponding CAN message in the buffering table of the memory region using buffering table type information of the corresponding CAN message;

determining, by the IDS core, whether a buffer index of the buffering table type information is 0, null, inactivate, or minor; and determining, by the IDS core, that the corresponding CAN message is a message not requiring buffering.

9. The operating method of claim 8, further comprising transmitting, by the IDS core, a message address of a currently copied item and address information of detection policy rules to the detection engine base through the interface without storing the corresponding CAN message in the buffering table.

10. A controller area network (CAN) intrusion detection system (IDS) comprising:

an electronic control unit (ECU) layer or an AUTomotive Open System ARchitecture (AUTOSAR) layer implemented on at least one hardware processor;

a real time environment (RTE) or an interface executed by at least one hardware processor and configured to connect components of the AUTOSAR layer to an application (app); and an IDS core layer and an IDS detect layer executed by at least one hardware processor and installed on the app, wherein the AUTOSAR layer includes a CAN packet mirroring system, the CAN packet mirroring system executed by at least one processor receives a CAN message from a CAN driver which exists in an AUTOSAR protocol data unit (PDU) router (PduR) region of the AUTOSAR layer, stores the received CAN message in a plurality of storage regions of a memory, separately manages the plurality of storage regions as a shared memory, copies CAN standard message data stored in a first shared memory region of the memory to store the copied CAN standard message data in a first engine memory region, and copies CAN flexible data (FD) message data stored in a second shared memory region of the memory to store the copied CAN FD message data in a second engine memory region, and an IDS core of the IDS core layer executed by at least one processor reads data copied by the CAN packet mirroring system and transmits the copied data to a detection engine base of the IDS core and separately manages a first memory region for storing a policy binary file which is policy rules of the IDS and a second memory region for storing a buffering table for buffering and storing the CAN message, wherein the IDS core copies the CAN data from the shared memory and retrieves the copied CAN data to an engine memory before the copied CAN data is transmitted to the detection engine base, and the CAN message retrieved by the engine memory is stored in the buffering table, wherein the CAN standard message data and the CAN FD message data have different lengths, and the CAN message retrieved by the engine memory is stored in the buffering table, and wherein the shared memory is configured to buffer detection log data and support concurrent access by a plurality of nodes, and the detection engine base is configured to copy at least one CAN message from the shared memory into the engine memory that is separate from the shared memory, and to perform detection processing based on the copied CAN message stored in the engine memory.

11. The CAN IDS of claim 10, wherein, to store the CAN message in the buffering table, the IDS core searches a lookup table of policy binary files using bus information and a CAN identification (ID) of the retrieved CAN message.

12. The CAN IDS of claim 11, wherein the IDS core stores the CAN message in a specific storage region of the memory using previously found buffering table type information of the CAN message, and the buffering table type information includes buffer type information and buffer index information.

13. The CAN IDS of claim 12, wherein the IDS core searches the lookup table and processes the CAN message as at least one of a case where there is no corresponding information, a case where it is unnecessary to buffer the CAN message, and a case where it is necessary to process a case where the CAN message is buffered.

14. The CAN IDS of claim 13, wherein the IDS core searches the lookup table for a detection policy through a binary search on the basis of the bus and the CAN ID of the CAN message retrieved from the engine memory, and when there is no corresponding policy in the lookup table, stores the CAN message in an unknown message buffer of the buffering table using unknown message buffering table information, increases a head value of the stored message by one, and transmits an address of a currently copied item in the buffering table, an address of detection policy rules, and information on a buffer type and a buffer index to the detection engine base through the interface.

15. The CAN IDS of claim 13, wherein the IDS core searches the lookup table for a detection policy through a binary search on the basis of the bus and the CAN ID of the CAN message retrieved from the engine memory, and when a corresponding policy or message is found in the lookup table, stores a corresponding CAN message in the buffering table of the memory using buffering table type information of the corresponding CAN message, increases a head value of the stored message by one, and transmits an address of a currently copied item in the buffering table, an address of detection policy rules, and information on a buffer type and a buffer index to the detection engine base through the interface.

16. The CAN IDS of claim 13, wherein the IDS core searches the lookup table for a detection policy through a binary search on the basis of the bus and the CAN ID of the CAN message retrieved from the engine memory, stores the corresponding CAN message in the buffering table of the memory region using buffering table type information of the corresponding CAN message when a detection policy corresponding to the CAN message is found in the lookup table, determines that the corresponding CAN message is a message not requiring buffering when a buffer index of the buffering table type information is 0, null, inactivate, or minor, and transmits a message address of a currently copied item and address information of detection policy rules to the detection engine base through an interface without storing the corresponding CAN message in the buffering table.

\*　\*　\*　\*　\*